United States Patent
Huang et al.

(10) Patent No.: US 10,757,723 B2
(45) Date of Patent: Aug. 25, 2020

(54) TRANSMITTING APPARATUS AND RECEIVING APPARATUS

(71) Applicant: Panasonic Intellectual Property Corporation of America, Torrance, CA (US)

(72) Inventors: Lei Huang, Singapore (SG); Hiroyuki Motozuka, Kanagawa (JP); Yao Huang Gaius Wee, Singapore (SG); Takenori Sakamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/368,236

(22) Filed: Mar. 28, 2019

(65) Prior Publication Data
US 2019/0223200 A1    Jul. 18, 2019

Related U.S. Application Data

(63) Continuation of application No. PCT/JP2017/034850, filed on Sep. 27, 2017.
(Continued)

(30) Foreign Application Priority Data

Sep. 6, 2017   (JP) ................. 2017-171484

(51) Int. Cl.
*H04W 72/12*    (2009.01)
*H04L 5/00*    (2006.01)
(Continued)

(52) U.S. Cl.
CPC ....... *H04W 72/1263* (2013.01); *H04L 5/0044* (2013.01); *H04L 5/0048* (2013.01);
(Continued)

(58) Field of Classification Search
None
See application file for complete search history.

(56) References Cited

U.S. PATENT DOCUMENTS

2014/0177543 A1    6/2014  Cordeiro
2017/0163395 A1*   6/2017  Kwak ................ H04L 27/18
(Continued)

OTHER PUBLICATIONS

International Search Report of PCT application No. PCT/JP2017/034850 dated Dec. 12, 2017.
(Continued)

*Primary Examiner* — Rebecca E Song
(74) *Attorney, Agent, or Firm* — Seed IP Law Group LLP

(57) ABSTRACT

A transmitting apparatus generates at least one of a first type of schedule element supporting an allocation involving a single channel and a second type of schedule element supporting an allocation involving a plurality of channels and transmits a MAC frame including the generated at least one schedule element over a first channel. When the allocation involving the plurality of channels includes the first channel, the transmitting apparatus generates a first type of schedule element including information regarding the allocation involving the plurality of channels and generates the second type of schedule element including difference information, and when the allocation involving the plurality of channels does not include the first channel, the transmitting apparatus omits the generation of the first type of schedule element and generates the second type of schedule element including all the information regarding the allocation involving the plurality of channels.

10 Claims, 21 Drawing Sheets

Related U.S. Application Data

(60) Provisional application No. 62/408,110, filed on Oct. 14, 2016.

(51) Int. Cl.
  *H04W 48/10* (2009.01)
  *H04W 80/02* (2009.01)
  *H04W 84/12* (2009.01)

(52) U.S. Cl.
  CPC ....... *H04W 48/10* (2013.01); *H04W 72/1205* (2013.01); *H04W 72/1289* (2013.01); *H04L 5/0053* (2013.01); *H04W 72/1215* (2013.01); *H04W 80/02* (2013.01); *H04W 84/12* (2013.01)

(56) References Cited

U.S. PATENT DOCUMENTS

2018/0255537 A1* 9/2018 Park ............... H04L 5/0048
2019/0159239 A1* 5/2019 Cariou ............. H04W 74/0891

OTHER PUBLICATIONS

IEEE 802.11-16/0687r1, "Efficient Multi-Channel Operation in 11ay", May 16, 2016.

IEEE 802.11-16/1208r0, "Scheduling Allocation on Multi-channels in 11ay", Sep. 13, 2016.

IEEE 802.11-15/01358r6, "Specification Framework for TGay", Oct. 8, 2016.

IEEE Std 802.11ad(TM)—2012, IEEE Standard for Information Technology—, Telecommunications and information exchange between systems, Local and metropolitan area networks—, Specific requirements, Part 11: Wireless LAN Medium Access Control (MAC) and Physical Layer (PHY) Specifications, Amendment 3: Enhancements for Very High Throughput in the 60 GHz Band, Dec. 28, 2012, "8.4.2.134 Extended Schedule element", (pp. 149-151).

IEEE Std 802.11ad(TM)—2012, IEEE Standard for Information Technology—, Telecommunications and information exchange between systems, Local and metropolitan area networks—, Specific requirements, Part 11: Wireless LAN Medium Access Control (MAC) and Physical Layer (PHY) Specifications, Amendment 3: Enhancements for Very High Throughput in the 60 GHz Band, Dec. 28, 2012, "9.33.6 Channel access in scheduled DTI", (pp. 251-254).

IEEE Std 802.11ad(TM)—2012, IEEE Standard for Information Technology—, Telecommunications and information exchange between systems, Local and metropolitan area networks—, Specific requirements, Part 11: Wireless LAN Medium Access Control (MAC) and Physical Layer (PHy) Specifications, Amendment 3: Enhancements for Very High Throughput in the 60 GHz Band, Dec. 28, 2012 (All pages).

The Extended European Search Report dated Sep. 20, 2019 for the related European Patent Application No. 17859798.5.

Park et al: "Multi-channel operation in 11ay", IEEE, Mar. , 2016 (Mar. 1, 2016), XP055486123, Retrieved from the internet: URL:https://mentor.ieee.org/802.11/dcn/16/11-16-0401-00-00ay-multi-channel-operation-in-11ay.pptx [retrieved on Jun. 20, 2018].

* cited by examiner

TRANSMITTING APPARATUS AND RECEIVING APPARATUS

BACKGROUND

1. Technical Field

The present disclosure relates to a transmitting apparatus and a receiving apparatus.

2. Description of the Related Art

A 60 GHz band millimeter wave (60 GHz mmW) network that requires no license is drawing increasing attention. The wireless HD technology is the first 60 GHz mmW standard, which enables high-definition audio, video, and data multi-gigabit wireless streaming even between home electrical appliances, personal computers, and portable products.

For example, the Wireless Gigabit (WiGig) technology has been developed as another multi-gigabit wireless communication technology that operates in a 60 GHz mmW frequency band. The WiGig technology was standardized by the Institute of Electrical and Electronics Engineers (IEEE) as the IEEE 802.11ad standard. The WiGig technology uses a wide channel bandwidth of 2.16 GHz and thus can provide PHY (physical layer) data rates of up to 6.7 Gbps.

The working group for IEEE 802.11 has developed an IEEE 802.11ay air interface as a next-generation WiGig technology that can support PHY data rates exceeding 100 Gbps. In IEEE 802.11ay, a study is being conducted on utilizing a multi-channel technology utilizing a plurality of channels.

In succession to 802.11ad, the media access control (MAC) layer in 802.11ay supports, for example, centralized network architectures for an infrastructure basic service set (BSS) and a personal BSS (PBSS). For example, a central coordinator, such as an access point (AP) or a personal BSS control point (PCP), transmits directivity multi gigabit (DMG) beacon frames or announce frames to stations (STAs: terminals) in a network in order to schedule allocations on one or more channels (e.g., with a channel bandwidth of 2.16 GHz).

Examples of related art include non-patent documents such as IEEE 802.11-15/1358r6, Specification Framework for TGay, October 2016, IEEE 802.11-16/1208r0, Scheduling Allocation on Multi-channels in 11ay, September 2016, IEEE Std 802.11ad™-2012, Section 8.4.2.134 Extended Schedule Element, pages 149-151, December 2012, and IEEE Std 802.11ad™-2012, Section 9.33.6 Channel Access in Scheduled DTI, pages 251-254, December 2012.

SUMMARY

However, a study on performing efficient scheduling under an environment where a plurality of standards coexist has been insufficient.

One non-limiting and exemplary embodiment provides a transmitting apparatus and a receiving apparatus that can execute efficient scheduling for allocations on one or more channels in a network.

In one general aspect, the techniques disclosed here feature a transmitting apparatus including: a transmission-signal generating circuit that generates at least one of a first type of schedule element supporting an allocation involving a single channel and a second type of schedule element supporting an allocation involving a plurality of channels and that generates a MAC frame including the generated first type of schedule element and/or the generated second type of schedule element; and a transmitting circuit that transmits the MAC frame over a first channel. When the allocation involving the plurality of channels includes the first channel, the transmission-signal generating circuit generates the first type of schedule element including all information regarding the allocation involving the plurality of channels and generates the second type of schedule element including difference information indicating the generated first type of schedule element, and when the allocation involving the plurality of channels does not include the first channel, the transmission-signal generating circuit omits the generation of the first type of schedule element and generates the second type of schedule element including all the information regarding the allocation involving the plurality of channels.

One aspect of the present disclosure is to execute efficient scheduling for allocations on one or more channels in a network.

It should be noted that general or specific embodiments may be implemented as a system, an apparatus, a device, a method, an integrated circuit, a computer program, a recording medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

The present disclosure can be better understood with the help of the accompanying drawings and the embodiments below. The embodiments recited herein are merely exemplary in practice, are used to describe some feasible applications and usages in the present disclosure, and should not be construed as limiting the present disclosure with respect to alternative embodiments not explicitly recited herein.

There are one or more central controllers in each of many wireless communication systems. Central controllers determine, for example, a wireless network service area, a wireless frequency channel, an apparatus permission policy, and adjustment with another neighboring wireless network and also typically play a role of gateways to back-end infrastructure networks. Examples of the central controllers include a base station or an Evolved Node B (eNB) in a cellular wireless network or a PCP or an AP (which may hereinafter be referred to as a "PCP/AP") in a wireless local area network WLAN).

Although a WLAN system based on IEEE 802.11 and a technology related thereto will be described in each embodiment described below, the present disclosure is not limited thereto and may also be applied to a large number of wireless communication systems.

In a WLAN based on IEEE 802.11, many networks operate in an infrastructure mode, that is, a large amount of traffic in a network is transmitted via a PCP/AP. Accordingly, a STA that joins the WLAN first performs network membership negotiation with the PCP/AP through processes called association and authentication.

Figure 1:
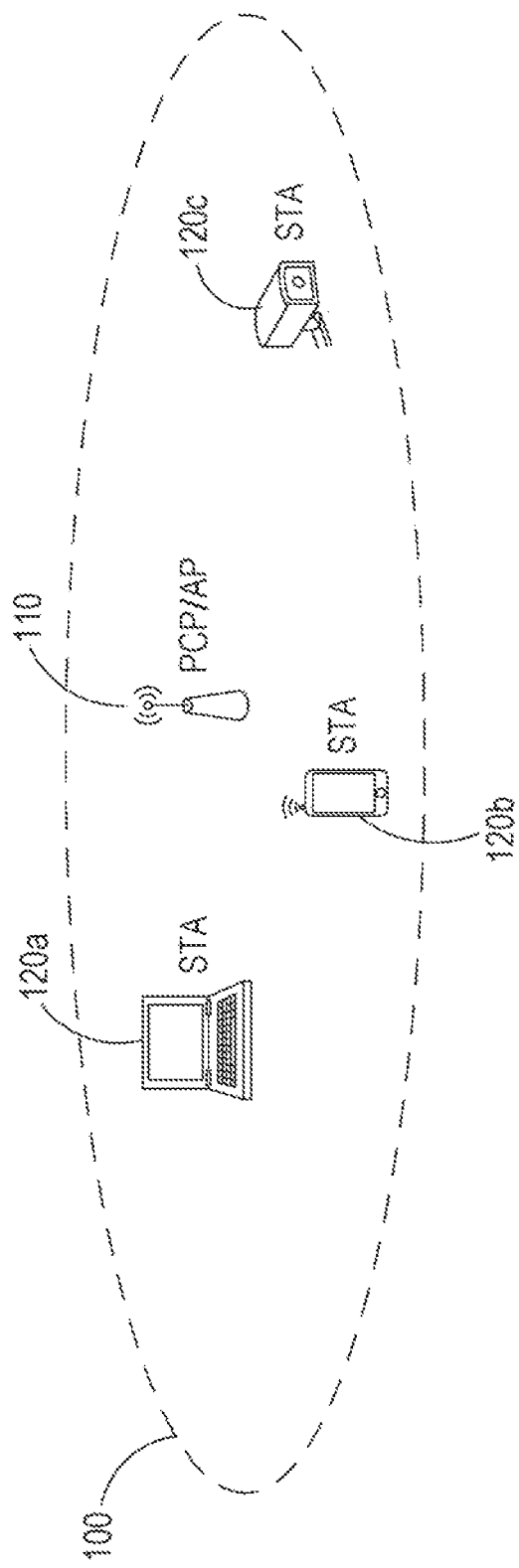
FIG. 1 is a diagram illustrating one example of a wireless network including a PCP/AP and a plurality of STAs.

FIG. 1 is a diagram illustrating one example of a wireless network 100 including a PCP/AP 110 and a plurality of STAs 120 (120a, 120b, and 120c). The PCP/AP 110 complies with the IEEE 802.11ay standard and is called an enhanced directional multi-gigabit (EDMG)_PCP/AP. One or more of the plurality of STAs may comply with the IEEE 802.11ay standard, and the other STA(s) may comply with the IEEE 802.11ad standard.

In the following description, a STA and a PCP/AP that comply with the IEEE 802.11ay standard are referred to as an "EDMG_STA" and an "EDMG_PCP/AP", respectively, and a STA and a PCP/AP that comply with the IEEE 802.11ad standard are referred to as a "DMG_STA" and a "DMG_PCP/AP", respectively.

The PCP/AP 110 communicates with each DMG_STA through a primary channel. The PCP/AP 110 communicates with each EDMG_STA through one or more channels including the primary channel or one or more channels not including the primary channel. The primary channel is a channel that is common to operations of the plurality of STAs 120 including the EDMG_STA(s) and the DMG_STA(s) in the wireless network 100. For example, the PCP/AP 110 designates, as the primary channel, one of a plurality of channels having a 2.16 GHz bandwidth (the channels are hereinafter referred to as "2.16 GHz channels") and notifies the other EDMG_STA(s) and DMG_STA(s) in a BSS about the designated channel.

In the wireless network 100, channel access by the plurality of STAs 120 is performed in a beacon interval and is adjusted using scheduling. The PCP/AP 110 may perform the scheduling and may communicate scheduling information to the plurality of STAs 120 by using a DMG beacon frame or an announce frame transmitted over the primary channel. The plurality of STAs 120 receives the scheduling information and accesses media in a scheduled period by using an access rule specific to the period.

Figure 2:
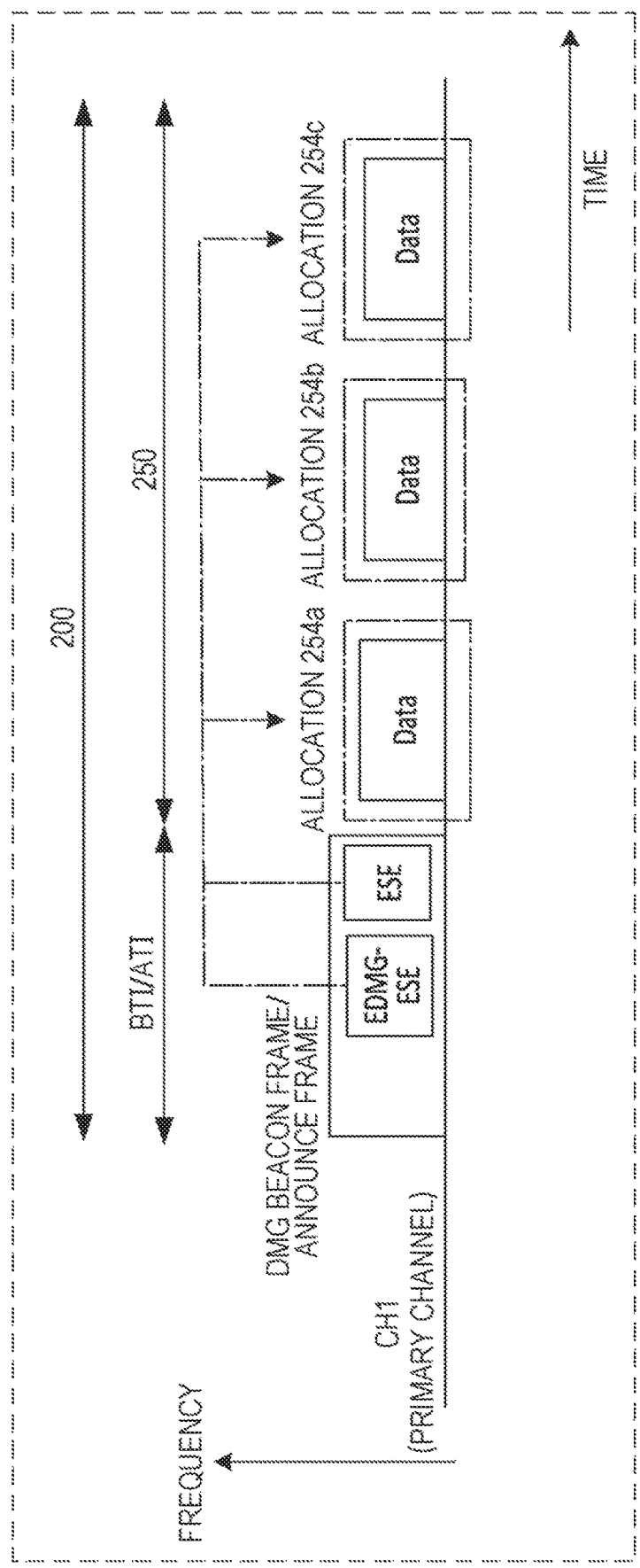
FIG. 2 is a diagram illustrating one example of allocation scheduling for a primary channel in a beacon interval in the wireless network.

FIG. 2 is a diagram illustrating one example of allocation scheduling for a primary channel in a beacon interval 200 in the wireless network 100. The horizontal axis in FIG. 2 represents a time axis, and the scheduling in FIG. 2 represents allocations in a time direction.

The beacon interval 200 includes a data transfer interval (DTI) 250. The DTI 250 includes, for example, a plurality of scheduled allocations 254, such as allocations 254a, 254b, and 254c. Each of the allocations 254 is allocated on the primary channel CH1 in the wireless network 100.

Scheduling information for the plurality of allocations 254 in the DTI 250 is included in an extended schedule element (ESE) in a DMG beacon frame or an announce frame or an EDMG_ESE in a DMG beacon frame or an announce frame.

The ESE is defined by the IEEE 802.11ad standard. The ESE is decoded by both a DMG_STA and an EDMG_STA. The EDMG_ESE is defined by the IEEE 802.1 lay standard. Although the EDMG_ESE is decoded by an EDMG_STA, it is difficult for a DMG_STA to decode the EDMG_ESE. The DMG beacon frame is transmitted over the primary channel in a beacon transmission interval (BTI). The announce frame is transmitted over the primary channel in an announcement transmission interval (ATI). The BTI and the ATI are both provided prior to the DTI 250 in the same beacon interval 200.

Next, a description will be given of channel aggregation (channel bonding) supported by the IEEE 802.1 lay standard.

Figure 3:
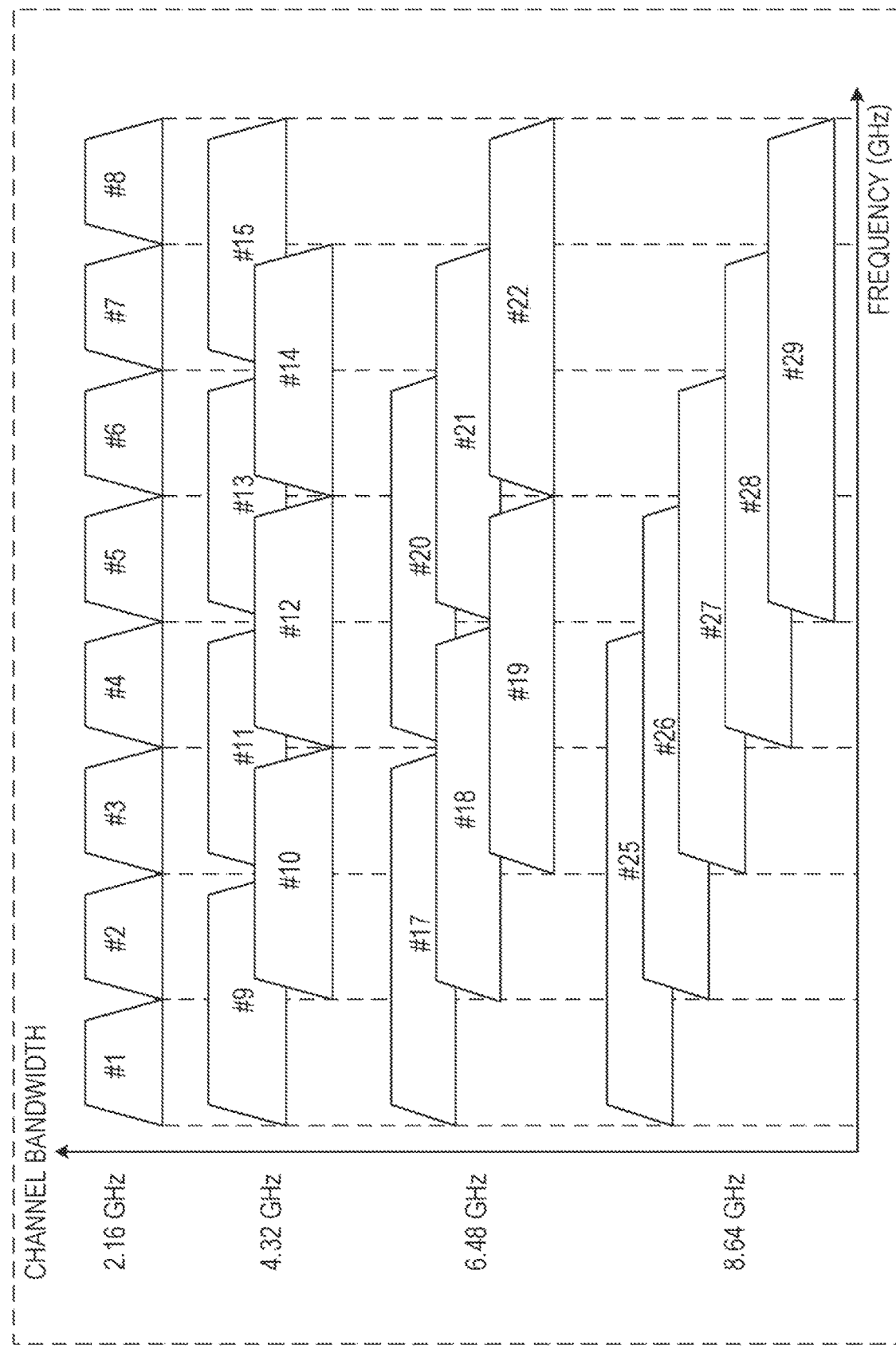
FIG. 3 is a diagram illustrating one example of channel bandwidths in channelization.

FIG. 3 is a diagram illustrating one example of channel bandwidths in channelization. The horizontal axis in FIG. 3 represents a frequency, and the vertical axis represents a bandwidth of each channel in the channelization.

The IEEE 802.11ay standard supports channel bonding of at least two 2.16 GHz channels and contiguous and non-contiguous channel aggregation of two or less 2.16 GHz channels or two or less 4.32 GHz bandwidth channels (4.32 GHz channels).

A signaling field in an EDMG Header A field channel in an EDMG single user PHY protocol data unit (EDMG SU PPDU) or an EDMG multi user PHY protocol data unit (EDMG MU PPDU) is used in order to indicate a channel allocation.

For example, in a 1-bit channel aggregation field, "0" is set for a 2.16 GHz, 4.32 GHz, 6.48 GHz, or 8.64 GHz PPDU. Also, in the 1-bit channel aggregation field, "1" is set for aggregation of two 2.16 GHz channels or aggregation of two 4.32 GHz channels.

For example, an 8-bit BW field indicates a PPDU bandwidth. Eight bits correspond to, in FIG. 3, channels #1 to #8 of 2.16 GHz channels. A bit corresponding to a channel used for PPDU transmission is set to "1".

Thus, the IEEE 802.11ay standard supports performing communication using one or more channels. Next, a description will be given of allocations on one or more channels.

Figure 4:
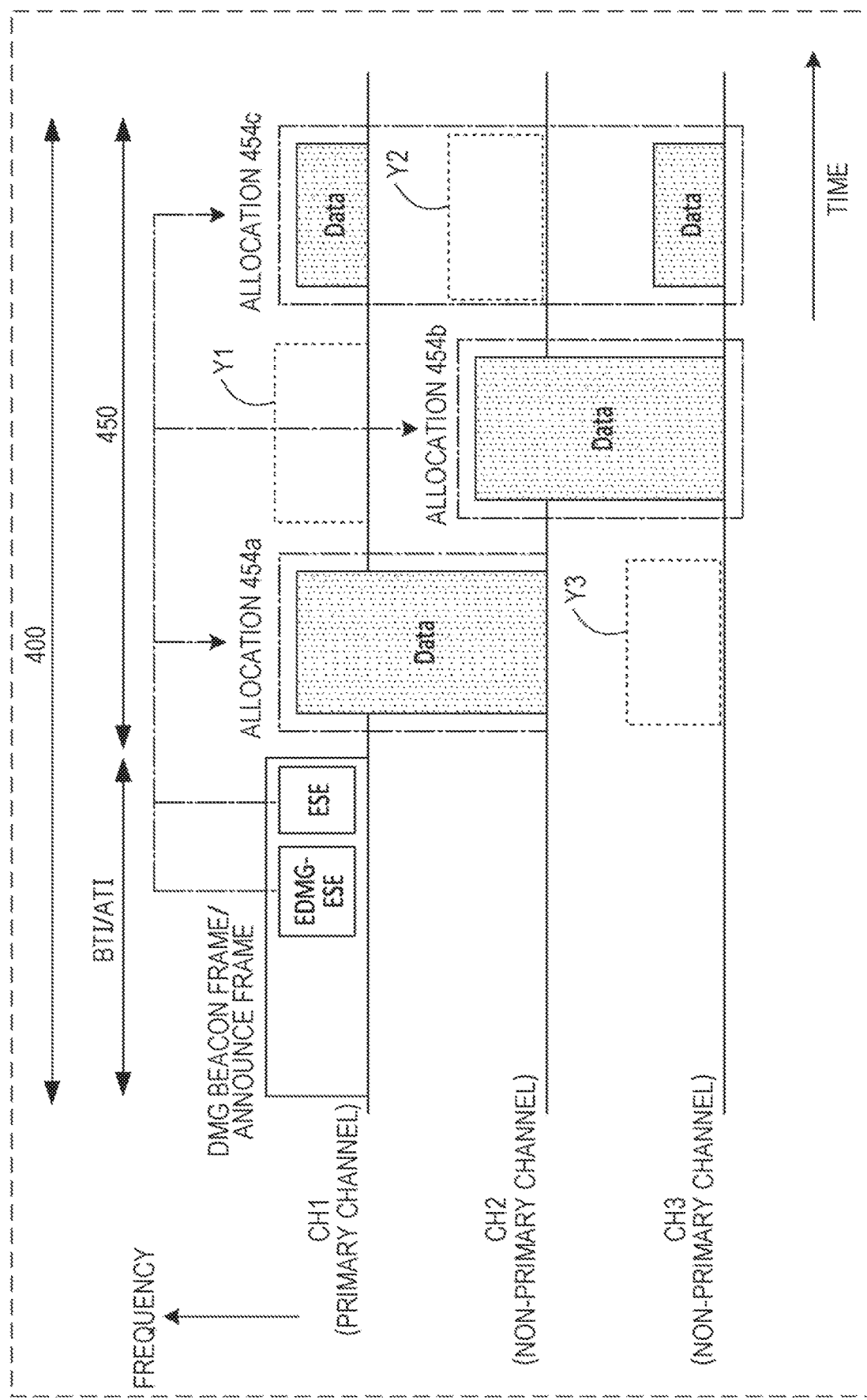
FIG. 4 is a diagram illustrating one example of scheduling of allocations on one or more channels in a beacon interval in the wireless network.

FIG. 4 is a diagram illustrating one example of scheduling of allocations on one or more channels in a beacon interval 400 in the wireless network 100. The horizontal axis in FIG. 4 represents a time axis, and the scheduling in FIG. 4 represents allocations on each channel in the time direction. Channels CH1, CH2, and CH3 in FIG. 4 are, for example, 2.16 GHz channels.

The beacon interval 400 includes a DTI 450. The DTI 450 includes, for example, a plurality of scheduled allocations 454, that is, allocations 454a, 454b, and 454c. Each of the scheduled allocations 454 is scheduled on either one channel or two or more channels. Each allocation (e.g., the allocation 454b) does not have to include the primary channel CH1 in the wireless network 100.

For example, the allocation 454a is scheduled on the primary channel CH1 and a non-primary channel CH2. The allocation 454b is also scheduled on the non-primary channel CH2 and a non-primary channel CH3. The allocation 454c is scheduled on the primary channel CH1 and the non-primary channel CH3.

Also, in FIG. 4, a resource (a region Y1 in FIG. 4) in a time corresponding to the time of the allocation 454b, the resource being included in the primary channel CH1, is an available resource. A resource (a region Y2 in FIG. 4) in a time corresponding to the time of the allocation 454c, the resource being included in CH2, is an available resource. A resource (a region Y3 in FIG. 4) in a time corresponding to the time of the allocation 454a, the resource being included in CH3, is an available resource.

Scheduling information for the plurality of scheduled allocations 454 in the DTI 450 is included in an ESE in a DMG beacon frame or an announce frame or an EDMG_ESE in a DMG beacon frame or an announce frame.

More specifically, in any of the allocations, part of the scheduling information is included in the ESE, and the remaining scheduling information is included in the EDMG_ESE in the same DMG beacon frame or announce frame. In other words, the EDMG_ESE includes difference information for the ESE in order for allocation for either the same DMG beacon frame or announce frame.

The EDMG_ESE is defined by the IEEE 802.11ay standard. Although the EDMG_ESE is decoded by an EDMG_STA, it is difficult for a DMG_STA to decode the EDMG_ESE. The DMG beacon frame is transmitted over the primary channel in a BTI. The announce frame is transmitted over the primary channel in an ATI. The BTI and the ATI are both provided prior to the DTI 450 in the same beacon interval 400.

As described above, in scheduling for one or more channels, the scheduling information is included in an ESE and an EDMG_ESE. The ESE is decoded by both a DMG_STA and an EDMG_STA, and the EDMG_ESE is decoded by an EDMG_STA, but it is difficult for a DMG_STA to decode the EDMG_ESE. Next, the formats of an ESE and an EDMG_ESE will be described with reference to FIGS. 5 and 6.

<Format of ESE>

Figure 5:
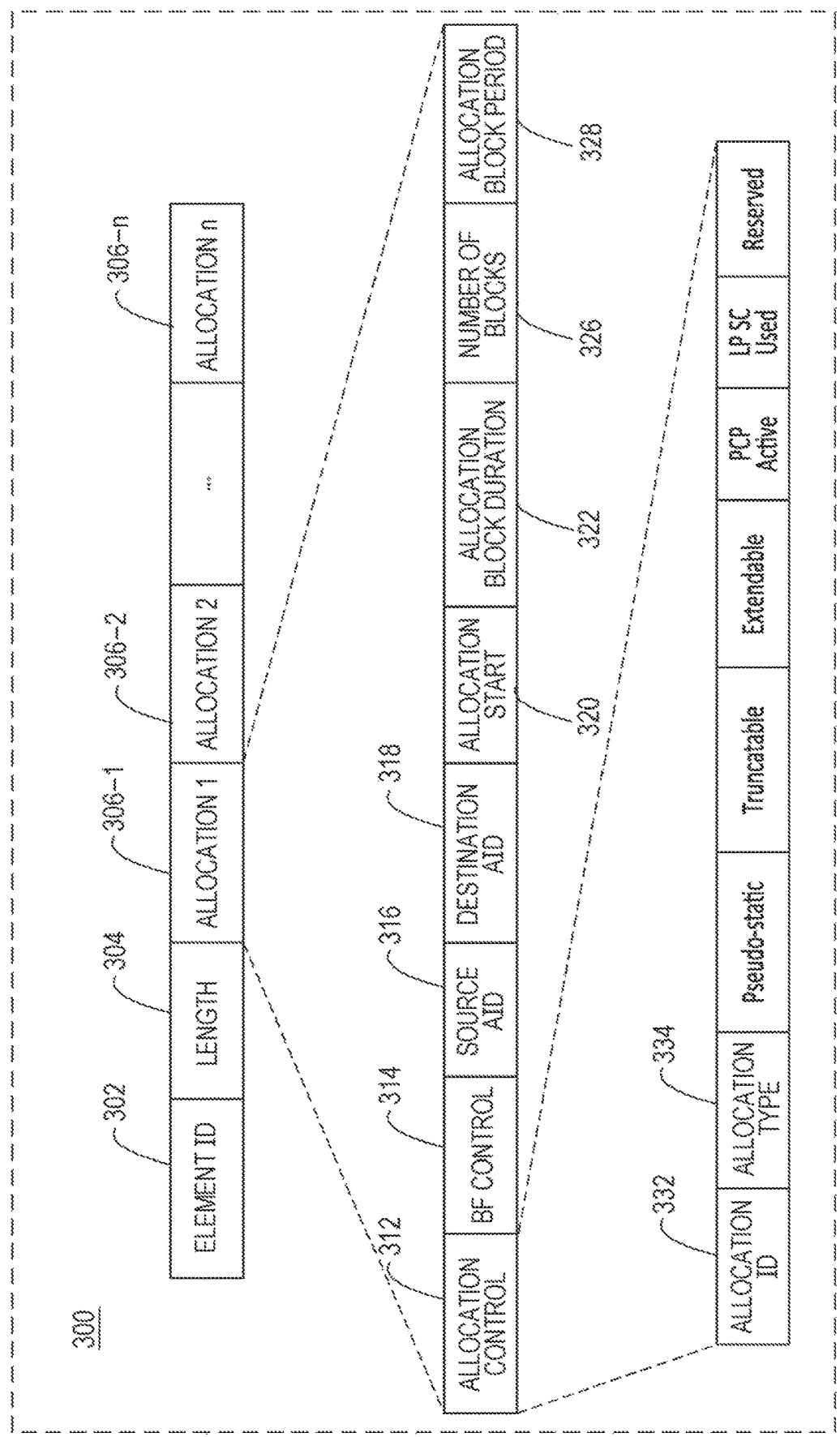
FIG. 5 is a diagram illustrating one example of the format of an ESE.

FIG. 5 is a diagram illustrating one example of the format of an ESE 300. The ESE 300 includes an element ID field 302, a length field 304, and allocation fields 306 (306-1 to 306-n, where n is an integer greater than or equal to 1).

The allocation fields 306 include scheduling information for specific allocations. Each of the allocation fields 306 includes an allocation control field 312, a beamforming (BF) control field 314, a source association identifier (AID) field 316, a destination AID field 318, an allocation start field 320, an allocation block duration field 322, a number-of-blocks field 326, and an allocation block period field 328. In addition, the allocation control field 312 includes a plurality of fields including an allocation ID field 332 and an allocation type field 334.

The element ID field 302 contains a value for uniquely identifying the ESE 300. Accordingly, each STA 120 can determine whether or not the format of the ESE 300 is an ESE format by referring to the value of the element ID field 302. The length field 304 specifies the number of octets in the allocation fields 306. The allocation type field 334 indicates whether a channel access mechanism during allocation is in a contention-based access period (CBAP) or in a service period (SP).

The source AID field 316 states information that specifies a STA that starts channel access during SP or CBAP allocation. Also, the source AID field 316 may be set to, in a CBAP allocation, a broadcast AID when all STAs can perform transmission during the CBAP allocation. The destination AID field 318 states information that specifies a STA that communicates with a source STA in an allocation. Also, the destination AID field 318 may be set to a broadcast AID when all STAs can communicate with a source STA in an allocation.

The allocation ID field 332, when it is set to a nonzero value, identifies an airtime allocation from a source AID to a destination AID. Except for CBAP allocations using a broadcast source AID and a broadcast destination AID, a tuple (a set of the values of a source AID, a destination AID, and an allocation ID) uniquely identifies the allocation. For CBAP allocations using a broadcast source AID and a broadcast destination AID, the allocation ID is set to zero.

The allocation start field 320 indicates the time at which SP or CBAP is started. The allocation block duration field 322 indicates the duration of a time block for which the SP or CBAP allocation is performed and that cannot cross beacon interval boundaries. The number-of-blocks field 326 contains the number of time blocks that make up the allocation. The allocation block period field 328 contains the start time of two contiguous time blocks belonging to the same allocation.

The allocation start field 320, the allocation block duration field 322, the number-of-blocks field 326, and the allocation block period field 328 are fields containing information for identifying the arrangement of the allocation in a time domain.

<Format of EDMG_ESE>

Figure 6:
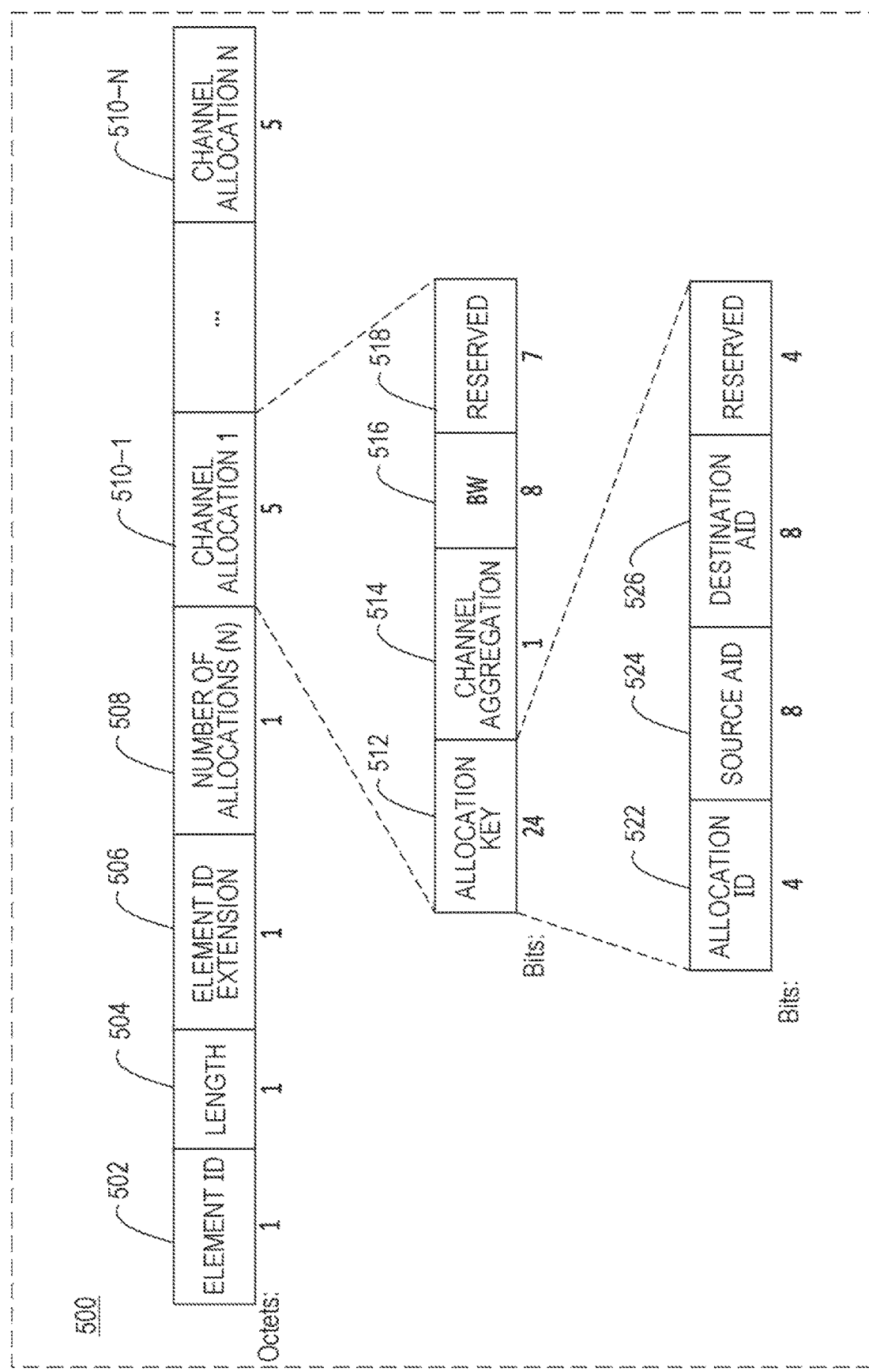
FIG. 6 is a diagram illustrating one example of the format of an EDMG_ESE.

FIG. 6 is a diagram illustrating one example of the format of an EDMG_ESE 500. The EDMG_ESE 500 includes an element ID field 502, a length field 504, an element ID extension field 506, a number-of-allocations field 508, and channel allocation fields 510 (510-1 to 510-N, where N is an integer greater than or equal to 1).

In FIG. 6, one example of the length (size) of each field is indicated by the number of octets or the number of bits. In each drawing described below, similarly, one example of the length (size) of each field is indicated by the number of octets or the number of bits.

The element ID field 502 and the element ID extension field 506 contain values for uniquely identifying the EDMG_ESE 500. Accordingly, each STA 120 can determine whether or not the format of the EDMG_ESE 500 is an EDMG_ESE format, by referring to the values of the element ID field 502 and the element ID extension field 506.

The length field 504 specifies the number of octets in the element ID extension field 506, the number-of-allocations field 508, and the channel allocation fields 510. The number-of-allocations field 508 indicates the number of channel allocation fields 510.

The channel allocation fields 510 each contain difference scheduling information (incremental scheduling information) for a specific allocation. The channel allocation fields 510 each include an allocation key field 512, a channel aggregation field 514, a BW (bandwidth) field 516, and a reserved field 518. The allocation key field 512 includes an allocation ID field 522, a source AID field 524, and a destination AID field 526. The allocation key field 512 is used to identify the allocation.

The channel aggregation field 514 and the BW field 516 specify a bandwidth occupied by the allocation. For example, the channel aggregation field 514, which is 1 bit, is set to "0" for an allocation that occupies a single 2.16 GHz, 4.32 GHz, 6.48 GHz, or 8.64 GHz channel and is set to "1" for an allocation that occupies two channels. Channel aggregation may occupy two non-contiguous 2.16 GHz channels (e.g., channels #1 and #3 in FIG. 3) or two non-contiguous 4.32 GHz channels (e.g., channels #9 and #12 in FIG. 3) or may occupy two contiguous 2.16 GHz channels (e.g., channels #1 and #2 in FIG. 3) or two contiguous 4.32 GHz channels (e.g., channels #9 and #11 in FIG. 3).

The BW field 516, which is 8 bits, indicates a bandwidth of the allocation. For example, eight bits (bits 0 to 7) correspond to 2.16 GHz channels having channel numbers 1 to 8, respectively. When the bit is set to 1, this indicates that the corresponding 2.16 GHz channel is used for the allocation.

When the EDMG_ESE 500 (see FIG. 6) exists in a transmitted DMG beacon frame or announce frame, the ESE 300 (see FIG. 5) also exists in the same frame.

An EDMG_STA decodes the EDMG_ESE 500 and the ESE 300 and compares values of the fields included in each channel allocation field 510 with values of the fields included in each allocation field 306 to thereby determine whether or not the channel allocation field 510 is to be ignored (discarded).

When the value of the allocation ID field 522, the value of the source AID field 524, and the value of the destination AID field 526 in the allocation key field 512 in one channel allocation field 510 (e.g., the channel allocation field 510-1) that exists in the EDMG_ESE 500 do not match the value of the allocation ID field 332, the value of the source AID field 316, and the value of the destination AID field 318, respectively, in any allocation field 306 that exists in the ESE 300 in the same frame, the allocation field (in this example, the channel allocation field 510-1) included in the EDMG_ESE 500 is ignored.

That is, when the allocation field 306 in which the value of the allocation ID field 522 and the value of the allocation ID field 332 match each other, the value of the source AID field 524 and the value of the source AID field 316 match each other, and the value of the destination AID field 526 and the value of the destination AID field 318 match each other does not exist at all, the channel allocation field 510-1 is ignored (discarded).

Figure 7:
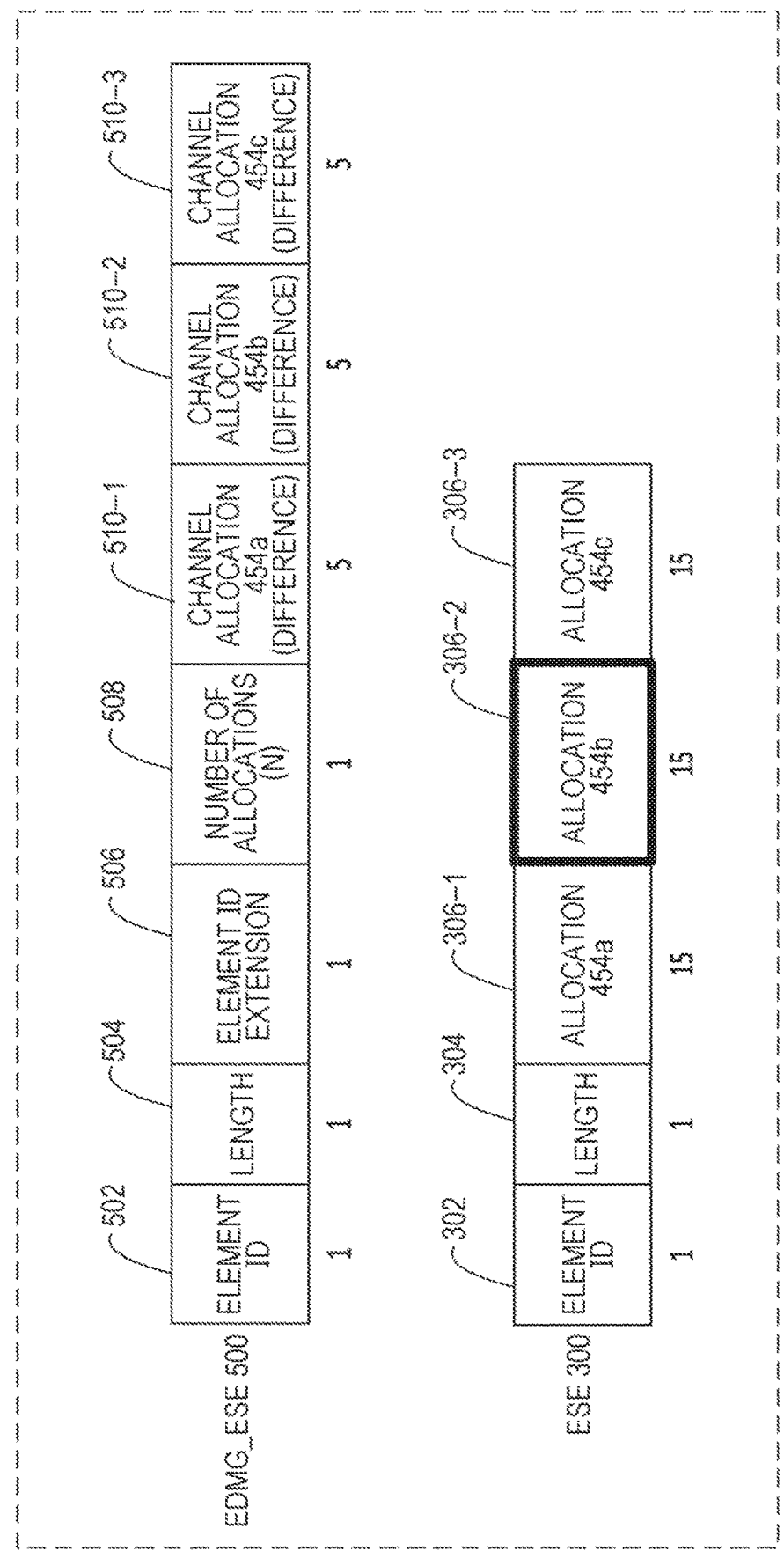
FIG. 7 is a diagram illustrating a first example of an EDMG_ESE and an ESE for allocations on one or more channels illustrated in FIG. 4.

FIG. 7 is a diagram illustrating a first example of an EDMG_ESE 500 and an ESE 300 for allocations on one or more channels illustrated in FIG. 4. The EDMG_ESE 500 and the ESE 300 in FIG. 7 are included in a DMG beacon frame or an announce frame transmitted over the primary channel (CH1 in FIG. 4).

In FIG. 7, fields that are analogous to those in FIGS. 5 and 6 are denoted by the same reference numerals, and descriptions thereof are omitted. Allocation fields 306-1 to 306-3 included in the ESE 300 in FIG. 7 contain scheduling information for the allocations 454*a*, 454*b*, and 454*c*, respectively, in FIG. 4. Channel allocation fields 510-1 to 510-3 included in the EDMG_ESE 500 in FIG. 7 contain difference scheduling information (denoted as "difference" in FIG. 7) for the allocations 454*a*, 454*b*, and 454*c*, respectively, in FIG. 4. The difference scheduling information is also referred to as "incremental scheduling information".

A DMG_PCP/AP located in the primary channel and in an adjacent network supports decoding of the ESE 300 but does not support decoding of the entire EDMG_ESE 500. Accordingly, the DMG_PCP/AP erroneously handles the allocation 454*b* not including the primary channel, as if the allocation 454*b* were allocated on the primary channel. This is because the DMG_PCP/AP identifies the arrangement of the allocation 454*b* in the time domain by using the allocation field 306-2, whereas the DMG_PCP/AP does not identify the bandwidths occupied by the allocation 454*b* (the channels included in the allocation 454*b*). Accordingly, the DMG_PCP/AP determines that the ESE 300 and the EDMG_ESE 500 included in the DMG beacon frame or the announce frame are allocated on the primary channel.

As a result, it is difficult for the DMG_PCP/AP in the adjacent network to allocate a resource (the region Y1 in FIG. 4) in the primary channel to a STA as another allocation, thus reducing the channel utilization efficiency of the primary channel.

In view of the foregoing problem, the present disclosure provides efficient scheduling for allocations without reducing the channel utilization efficiency.

According to the present disclosure, the PCP/AP 110 may transmit a DMG beacon frame or an announce frame over the primary channel. Alternatively, the PCP/AP 110 may sequentially transmit DMG beacon frames or announce frames over the primary channel or one or more non-primary channels.

The PCP/AP 110 may also transmit, in a BTI, a plurality of DMG beacon frames while switching a transmission direction (a transmission beam). For example, when the transmission beam is switched in 30 ways to transmit 30 DMG beacons, the PCP/AP 110 transmits the first-half 15 DMG beacons in an arbitrary BTI in an arbitrary beacon interval, performs data communication in a DTI at a subsequent stage, and then transmits the last-half 15 DMG beacons in a BTI in a next beacon interval. The first-half 15 DMG beacons and the last-half 15 DMG beacons may be transmitted using beam sets having different directivities. Similarly, the PCP/AP 110 may transmit, in an ATI, a plurality of announce frames while switching a transmission direction (a transmission beam). A plurality of announce frames may be separately transmitted across a plurality of beacon intervals.

First Embodiment

According to a first embodiment of the present disclosure, when a DMG beacon frame or announce frame including an ESE and an EDMG_ESE is transmitted over a primary channel, all scheduling information for each allocation that does not include the primary channel is included in the EDMG_ESE. Part of the scheduling information for each allocation including the primary channel is included in the ESE, and the remaining scheduling information is included in the EDMG_ESE.

In the description below, a DMG beacon frame or announce frame including an ESE and an EDMG_ESE is referred to as a "MAC frame", as appropriate. Also, a MAC frame including an ESE and an EDMG_ESE is not limited to a DMG beacon frame or an announce frame.

Figure 8:
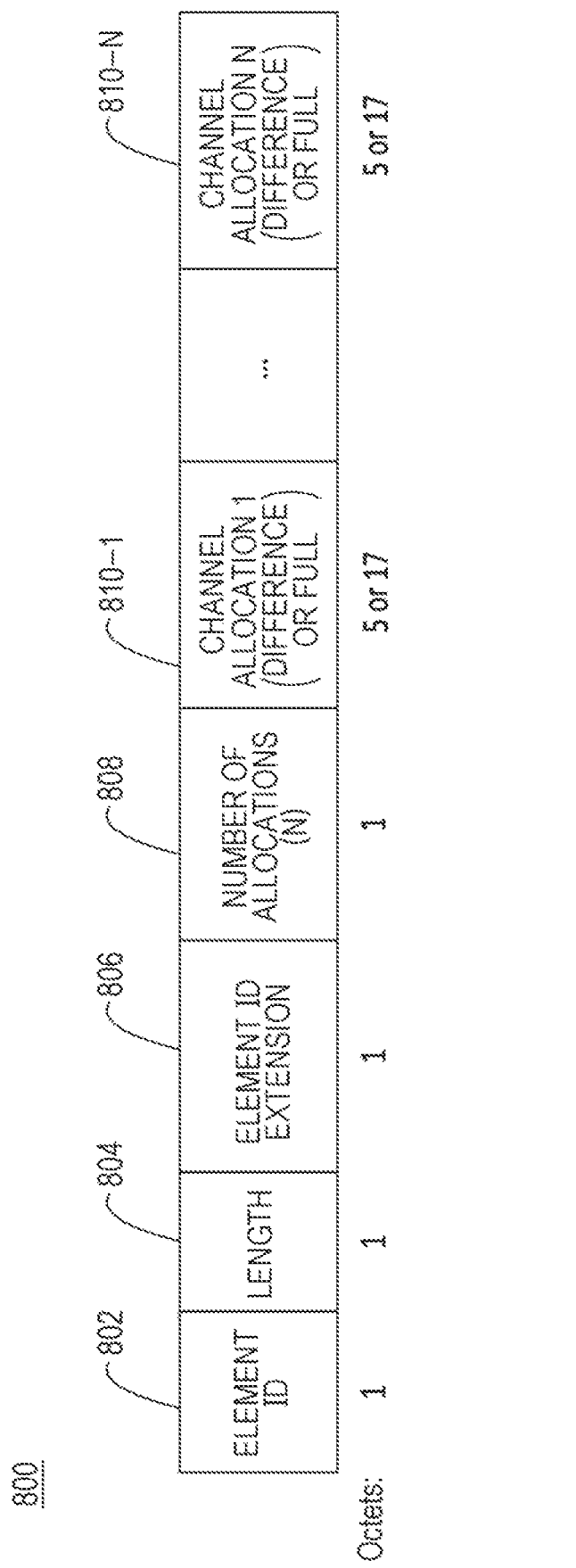
FIG. 8 is a diagram illustrating one example of the format of an EDMG_ESE according to a first embodiment of the present disclosure.

FIG. 8 is a diagram illustrating one example of the format of an EDMG_ESE 800 according to the first embodiment of the present disclosure. The EDMG_ESE 800 includes an element ID field 802, a length field 804, an element ID extension field 806, a number-of-allocations field 808, and channel allocation fields 810 (810-1 to 810-N, where N is an integer greater than or equal to 1).

The element ID field 802 and the element ID extension field 806 uniquely identify the EDMG_ESE 800. The length field 804 specifies the number of octets in the element ID extension field 806, the number-of-allocations field 808, and the channel allocation fields 810. The number-of-allocations field 808 indicates the number of channel allocation fields 810.

The channel allocation fields 810 (810-1 to 810-N) each contain either all scheduling information (complete: full) for specific allocations or difference scheduling information (incremental: difference). In each channel allocation field 810 containing all the scheduling information, the number of octets is set to a size of 17, and in each channel allocation field 810 containing the difference scheduling information, the number of octets is set to a size of 5.

The channel allocation field 810 containing the difference scheduling information for a specific allocation and the channel allocation field 810 containing all scheduling information for a specific allocation will be described with reference to FIG. 9. Hereinafter, each channel allocation field containing difference scheduling information for a specific allocation is referred to as an "IS (incremental signaling: difference signaling)-based channel allocation field", and each channel allocation field containing all scheduling information for a specific allocation is referred to as a "CS (complete signaling)-based channel allocation field".

Figure 9:
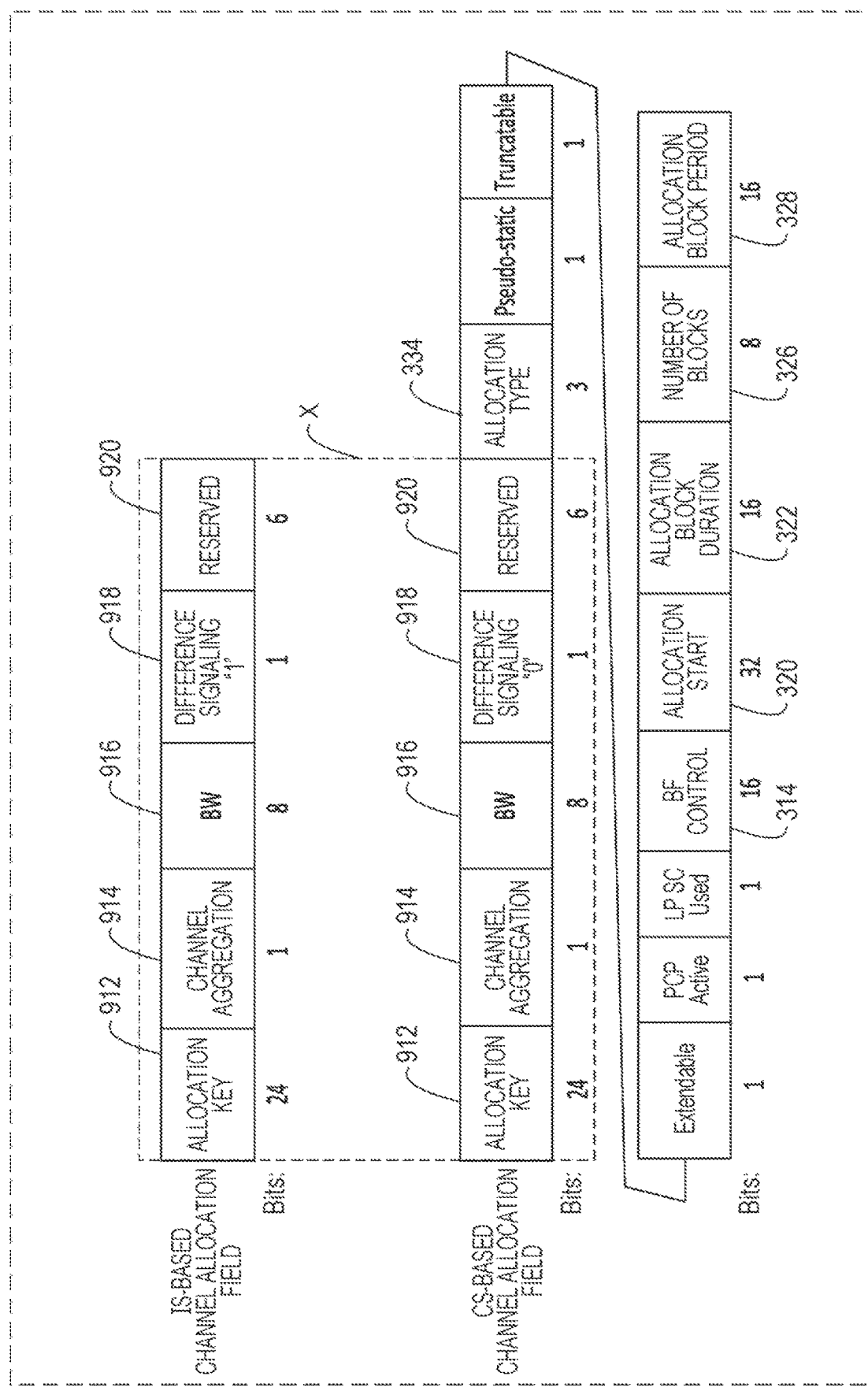
FIG. 9 is a diagram illustrating one example of the formats of IS-based and CS-based channel allocation fields included in the EDMG_ESE according to the first embodiment of the present disclosure.

FIG. 9 is a diagram illustrating one example of the formats of IS-based and CS-based channel allocation fields included in the EDMG_ESE 800 according to the first embodiment of the present disclosure.

The IS-based channel allocation field includes an allocation key field 912, a channel aggregation field 914, a BW field 916, a difference signaling field 918, and a reserved field 920.

The CS-based channel allocation field includes an allocation key field 912, a channel aggregation field 914, a BW field 916, a difference signaling field 918, and a reserved field 920 as fields (see frame X) that are the same as in the IS-based channel allocation field. The CS-based channel allocation field further includes an allocation type field 334, a BF control field 314, an allocation start field 320, an allocation block duration field 322, a number-of-blocks field 326, and an allocation block period field 328.

The allocation key field 912, the channel aggregation field 914, and the BW field 916 are analogous to the allocation key field 512, the channel aggregation field 514, and the BW field 516, respectively, in FIG. 6.

Also, the size (the number of bits) of the reserved field 920 is reduced by the number of bits corresponding to 1 bit in the difference signaling field from the reserved field 518 in FIG. 6. Accordingly, although, in the IS-based channel allocation field, a difference signaling field is added to the channel allocation fields 510 in FIG. 6, the sizes thereof are equal to each other.

The difference signaling field 918 indicates on which of the IS and the CS the channel allocation field is based. For example, when the channel allocation field is a field based on the IS, that is, an IS-based channel allocation field, the difference signaling field 918 is set to "1". When the channel allocation field is a field based on the CS, that is, a CS-based channel allocation field, the difference signaling field 918 is set to "0".

The allocation type field 334, the BF control field 314, the allocation start field 320, the allocation block duration field 322, the number-of-blocks field 326, and the allocation block period field 328 are analogous to the fields included in each allocation field 306 in FIG. 5.

The IS-based channel allocation field has the fields included in each channel allocation field 510 in FIG. 6 and contains difference scheduling information for a specific allocation. The difference scheduling information includes, for example, information about channels included in a specific allocation (channels occupied by a specific allocation).

The IS-based channel allocation field has the fields included in each channel allocation field 510 in FIG. 6 and the fields included in each allocation field 306 in FIG. 5 and contains all scheduling information for a specific allocation. All the scheduling information includes, for example, information about channels included in the specific allocation (channels occupied by the specific allocation) and information for identifying the arrangement of the specific allocation in the time domain.

Next, a description will be given of one example of scheduling and one example of an ESE and an EDMG_ESE for the scheduling.

Figure 10:
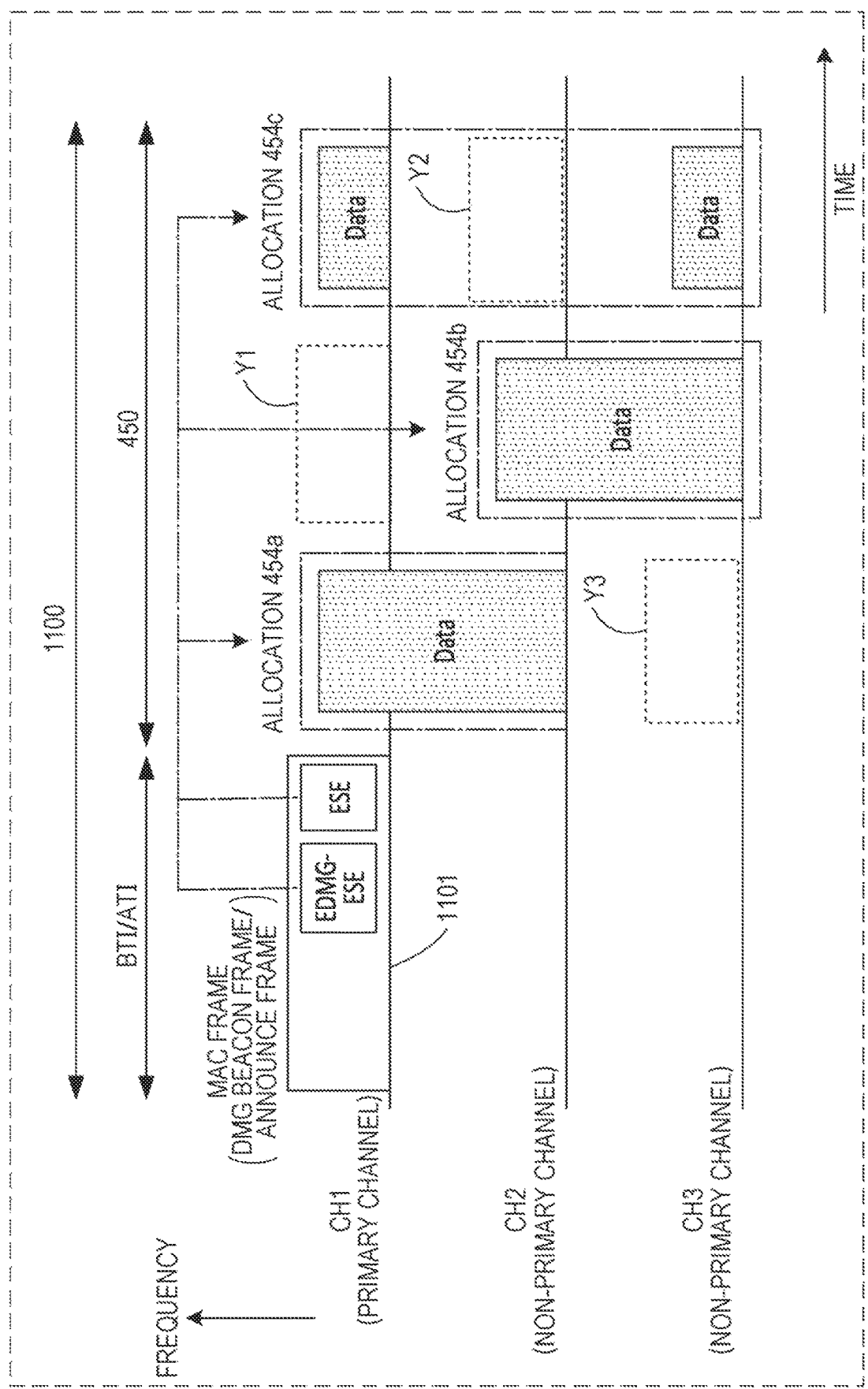
FIG. 10 is a diagram illustrating one example of scheduling of allocations on one or more channels in a beacon interval according to the first embodiment of the present disclosure.

FIG. 10 is a diagram illustrating one example of scheduling of allocations on one or more channels in a beacon interval 1100 according to the first embodiment of the present disclosure. The horizontal axis in FIG. 10 represents a time axis, and the scheduling in FIG. 10 indicates allocations on channels in the time direction. Each channel in FIG. 10 is, for example, a 2.16 GHz channel.

In FIG. 10, allocations 454*a* to 454*c* in a DTI 450 included in the beacon interval 1100 are analogous to those in FIG. 4. FIG. 4 and FIG. 10 differ from each other in a MAC frame 1101 that is transmitted in an interval provided prior to the DTI 450.

An EDMG_PCP/AP transmits the MAC frame 1101 over a primary channel.

The EDMG_PCP/AP may simultaneously transmit MAC frames over the primary channel, for example, by using channel aggregation. Alternatively, the EDMG_PCP/AP may sequentially transmit MAC frames over the primary channel, for example, by fragmenting a BTI.

An ESE includes allocation fields for signaling scheduling information for allocations including the primary channel over which the MAC frames are transmitted.

An EDMG_ESE includes a CS-based channel allocation field for signaling scheduling information for each allocation not including the channel over which the MAC frames are transmitted and an IS-based channel allocation field for signaling scheduling information for each allocation including the channel over which the MAC frames are transmitted.

For example, an EDMG_ESE included in the MAC frame 1101 transmitted over CH1 includes a CS-based channel allocation field for signaling scheduling information for the allocation 454b not including CH1 and IS-based channel allocation fields for signaling scheduling information for the allocations 454a and 454c including CH1.

Next, the ESE and the EDMG_ESE included in the MAC frame 1101 transmitted over CH1 in FIG. 10 will be described with reference to FIG. 11.

Figure 11:
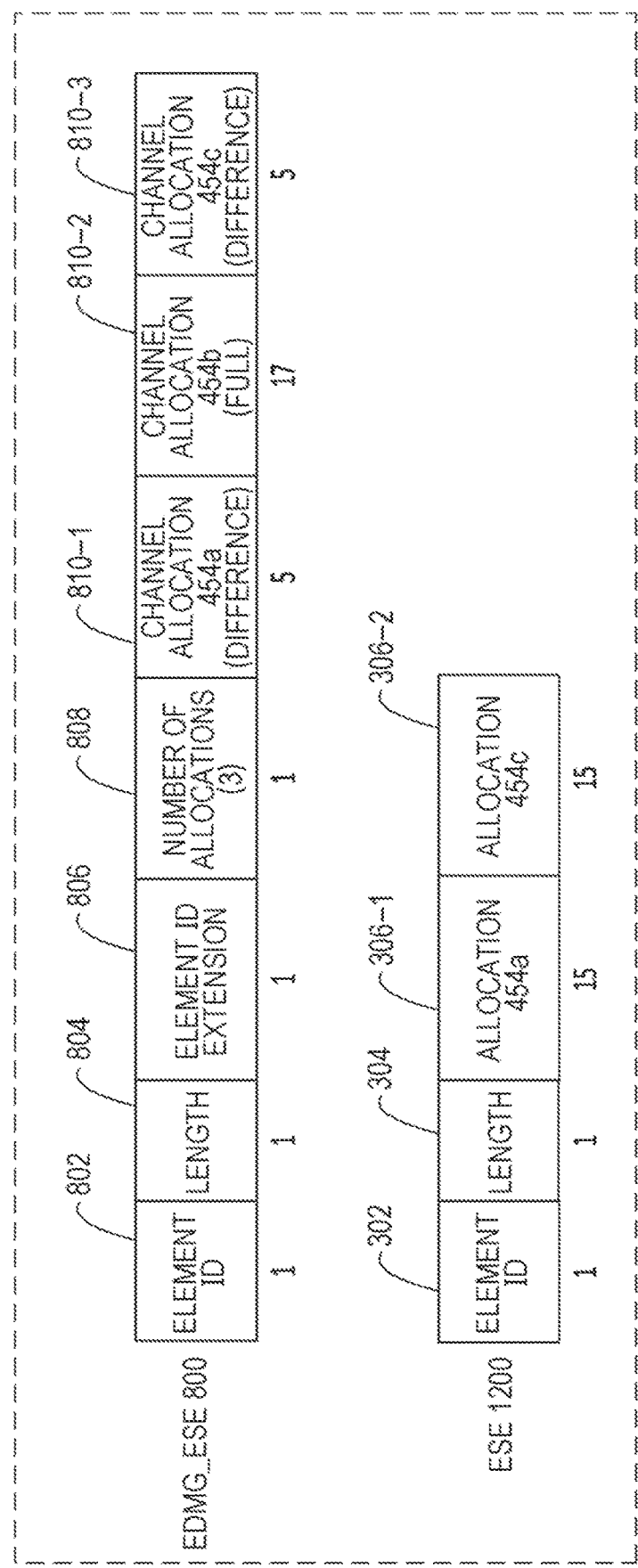
FIG. 11 is a diagram illustrating, in the first embodiment of the present disclosure, one example of an ESE and an EDMG_ESE transmitted over a primary channel CH1 in FIG. 10.

FIG. 11 is a diagram illustrating, in the first embodiment of the present disclosure, one example of an ESE 1200 and an EDMG_ESE 800 transmitted over the primary channel CH1 in FIG. 10. In FIG. 11, constituents that are analogous to those in FIGS. 5 and 8 are denoted by the same reference numerals, and descriptions thereof are omitted.

The ESE 1200 has an allocation field 306-1 for signaling scheduling information for the allocation 454a including the primary channel CH1 and an allocation field 306-2 for signaling scheduling information for the allocation 454c including the primary channel CH1. The ESE 1200, on the other hand, does not have an allocation field for signaling scheduling information for the allocation 454b not including the primary channel CH1.

The EDMG_ESE 800 has an IS-based channel allocation field (difference) 810-1 for signaling scheduling information for the allocation 454a including the primary channel CH1, a CS-based channel allocation field (full) 810-2 for signaling scheduling information for the allocation 454b not including the primary channel CH1, and an IS-based channel allocation field (difference) 810-3 for signaling scheduling information for the allocation 454c.

A DMG_PCP/AP located in the primary channel CH1 and in an adjacent network receives the MAC frame 1101 including the ESE 1200 and the EDMG_ESE 800 in FIG. 11 and decodes the ESE 1200 to obtain the scheduling information for the allocations 454a and 454c. On the other hand, since the ESE 1200 in FIG. 11 does not have the scheduling information for the allocation 454b, the DMG_PCP/AP does not obtain the scheduling information for the allocation 454b. Accordingly, the DMG_PCP/AP can perform another allocation (an allocation different from FIG. 10) to a resource (a region Y1 in FIG. 10) in a time corresponding to the time of the allocation 454b, the resource being included in the primary channel CH1.

Also, although the ESE 1200 in FIG. 11 does not have the scheduling information for the allocation 454b, the EDMG_ESE 800 in FIG. 11 has the CS-based channel allocation field 810-2 containing all scheduling information for the allocation 454b, and thus the EDMG_STA can obtain the scheduling information for all allocations including the allocation 454b by decoding the ESE 1200 and the EDMG_ESE 800 in FIG. 11.

Next, a description will be given of the configuration of a PCP/AP and the configuration of a STA according to the first embodiment described above.

<Configuration of PCP/AP>

Figure 12:
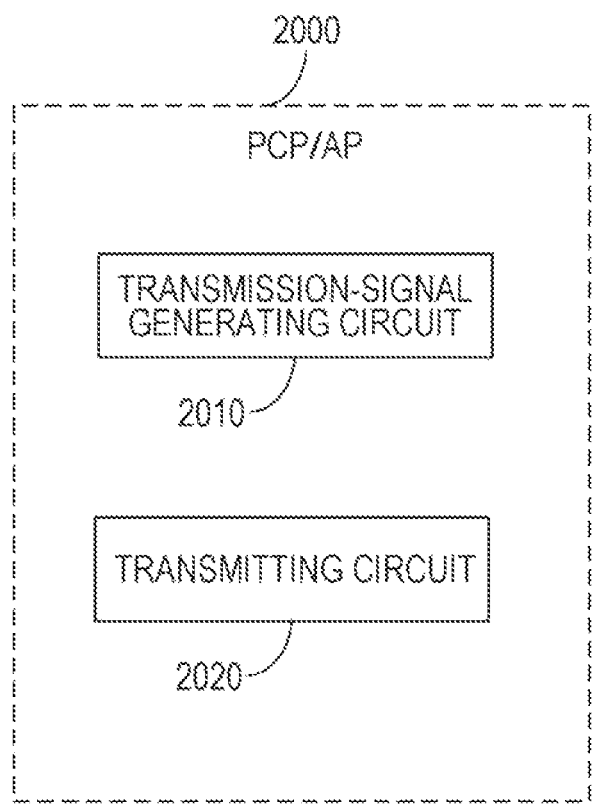
FIG. 12 is a simplified block diagram of a PCP/AP according to the first embodiment of the present disclosure.

FIG. 12 is a simplified block diagram of a PCP/AP 2000 according to the first embodiment of the present disclosure. The PCP/AP 2000 may be, for example, the PCP/AP 110 in FIG. 1. The PCP/AP 2000 includes a transmission-signal generating circuit 2010 and a transmitting circuit 2020. The transmission-signal generating circuit 2010 plays a role in generating a transmission signal, and the transmitting circuit 2020 plays a role in transmitting the generated signal.

Figure 13:
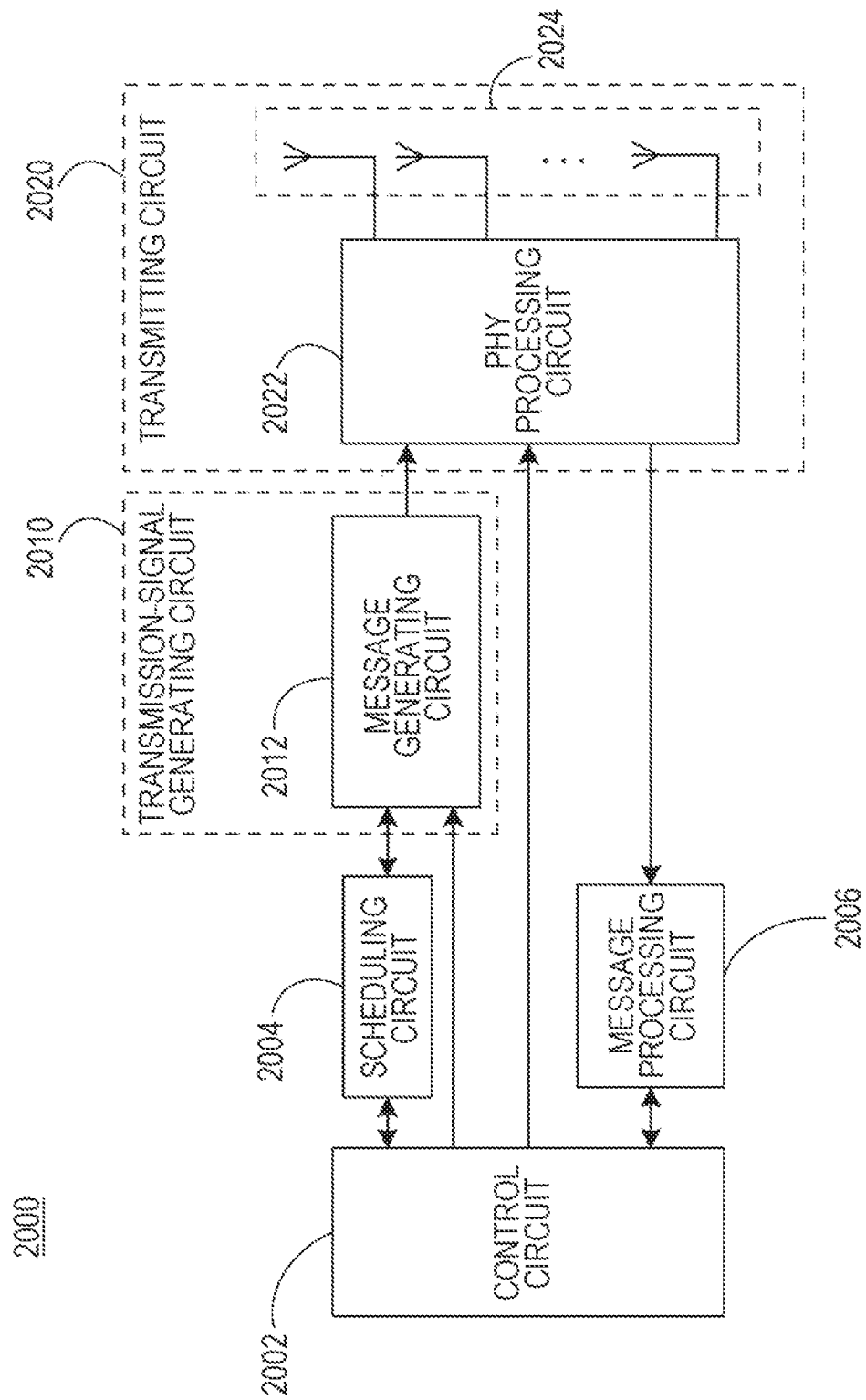
FIG. 13 is a detailed block diagram of the PCP/AP according to the first embodiment of the present disclosure.

FIG. 13 is a detailed block diagram of the PCP/AP 2000 according to the first embodiment of the present disclosure. The PCP/AP 2000 includes a control circuit 2002, a scheduling circuit 2004, a message processing circuit 2006, the transmission-signal generating circuit 2010, and the transmitting circuit 2020. The transmission-signal generating circuit 2010 includes a message generating circuit 2012, and the transmitting circuit 2020 includes a PHY processing circuit 2022 and a plurality of antennas 2024.

The control circuit 2002 is a MAC protocol controller and controls general MAC protocol operations. For example, the control circuit 2002 controls MAC protocol operations supported by the IEEE 802.11ad standard and the IEEE 802.11ay standard.

Under the control of the control circuit 2002, the scheduling circuit 2004 schedules channel time allocation.

Under the control of the control circuit 2002, the message generating circuit 2012 receives scheduling information from the scheduling circuit 2004 and generates a corresponding control, data, or management message, such as a MAC frame (a DMG beacon frame or an announce frame). The EDMG_ESE and the ESE included in the MAC frame are generated according to the above-described embodiment.

A transmission signal including the generated message is subjected to PHY processing performed by the PHY processing circuit 2022 and is then transmitted via the plurality of antennas 2024.

The message processing circuit 2006 analyzes a reception message received via the plurality of antennas 2024 and the PHY processing circuit 2022 and outputs the analyzed message to the control circuit 2002.

<Configuration of STA>

Figure 14:
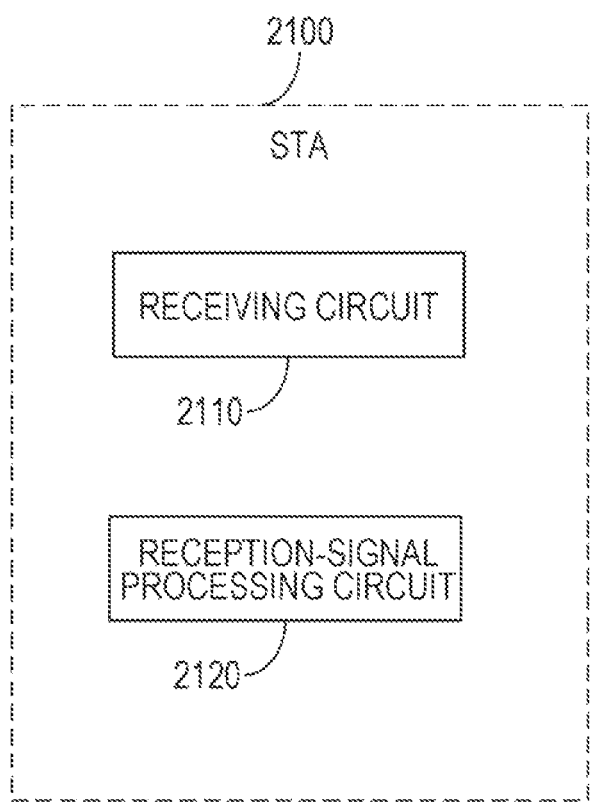
FIG. 14 is a simplified block diagram of a STA according to the first embodiment of the present disclosure.

FIG. 14 is a simplified block diagram of a STA 2100 according to the first embodiment of the present disclosure. The STA 2100 may be one of the plurality of STAs 120 in the wireless network 100 in FIG. 1. The STA 2100 includes a receiving circuit 2110 and a reception-signal processing circuit 2120. The receiving circuit 2110 plays a role in receiving a signal transmitted by the PCP/AP 2000. The reception-signal processing circuit 2120 plays a role in processing the received signal.

Figure 15:
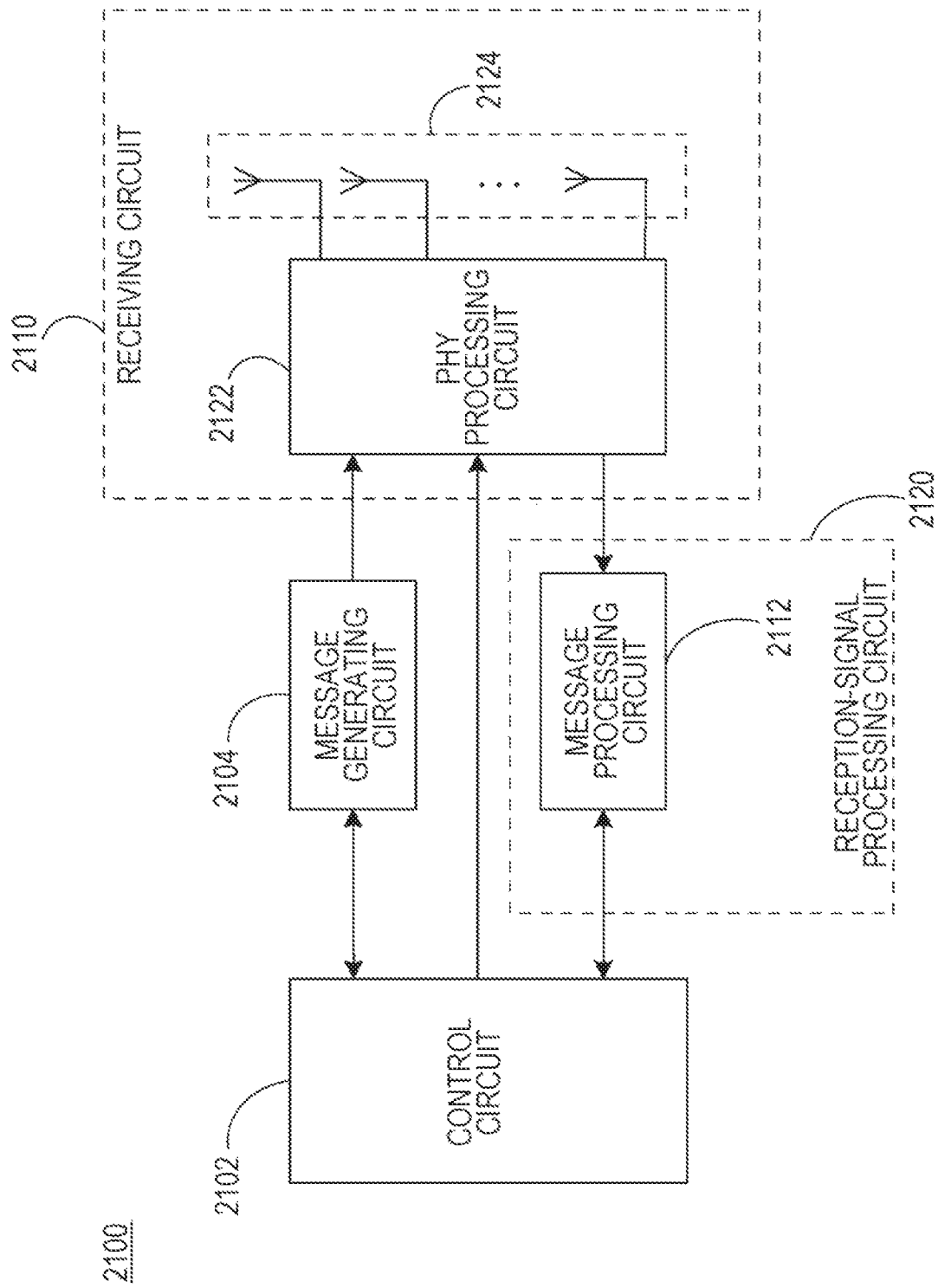
FIG. 15 is a detailed block diagram of the STA according to the first embodiment of the present disclosure.

FIG. 15 is a detailed block diagram of the STA 2100 according to the first embodiment of the present disclosure. The STA 2100 includes a control circuit 2102, a message generating circuit 2104, the receiving circuit 2110, and the reception-signal processing circuit 2120. The receiving circuit 2110 includes a PHY processing circuit 2122 and a plurality of antennas 2124. The reception-signal processing circuit 2120 includes a message processing circuit 2112.

The control circuit 2102 is a MAC protocol controller and controls general MAC protocol operations.

Under the control of the control circuit 2102, the message generating circuit 2104 generates a control, data, or management message, such as a MAC frame.

A transmission signal including the generated message is subjected to PHY processing performed by the PHY processing circuit 2122 and is then transmitted via the plurality of antennas 2124.

Under the control of the control circuit 2102, the message processing circuit 2112 analyzes a control, data, or management message received via the plurality of antennas 2124 and the PHY processing circuit 2122 and supplies the analyzed message to the control circuit 2102. The EDMG_ESE and the ESE included in the MAC frame are generated according to the embodiment described above.

<Summary of First Embodiment>

In the first embodiment described above, the EDMG_ESE included in a MAC frame transmitted over the primary channel includes all scheduling information for each allocation not including (not occupying) the primary channel, and the ESE does not include scheduling information for each allocation not including (not occupying) the primary channel. With this configuration, a DMG_PCP/AP located in the primary channel and in an adjacent network decodes the ESE to thereby make it possible to avoid interpreting an allocation not including the primary channel as an allocation including the primary channel. This allows the DMG_PCP/AP to more efficiently perform scheduling for the primary channel, thus improving the channel utilization efficiency of the primary channel.

Also, in the first embodiment, the first four signaling fields (or five signaling fields including the reserved field) in the IS-based channel allocation field are the same as the first four signaling fields (or five signaling fields including the reserved field) in the CS-based channel allocation field. As a result, a receiving apparatus (e.g., a STA) can handle the first four signaling fields in each channel allocation field in the same way, thus making it possible to simplify processing in the receiving apparatus.

<First Modification of First Embodiment>

In the first embodiment described above, the description has been given of an example in which the difference signaling field 918 (see FIG. 9) is used to indicate on which of the IS and the CS each channel allocation field 810 (see FIG. 8) is based. In a first modification of the first embodiment, a description will be given of an example in which a method different from the method using the difference signaling field 918 is used to indicate on which of the IS and the CS each channel allocation field is based.

Figure 16:
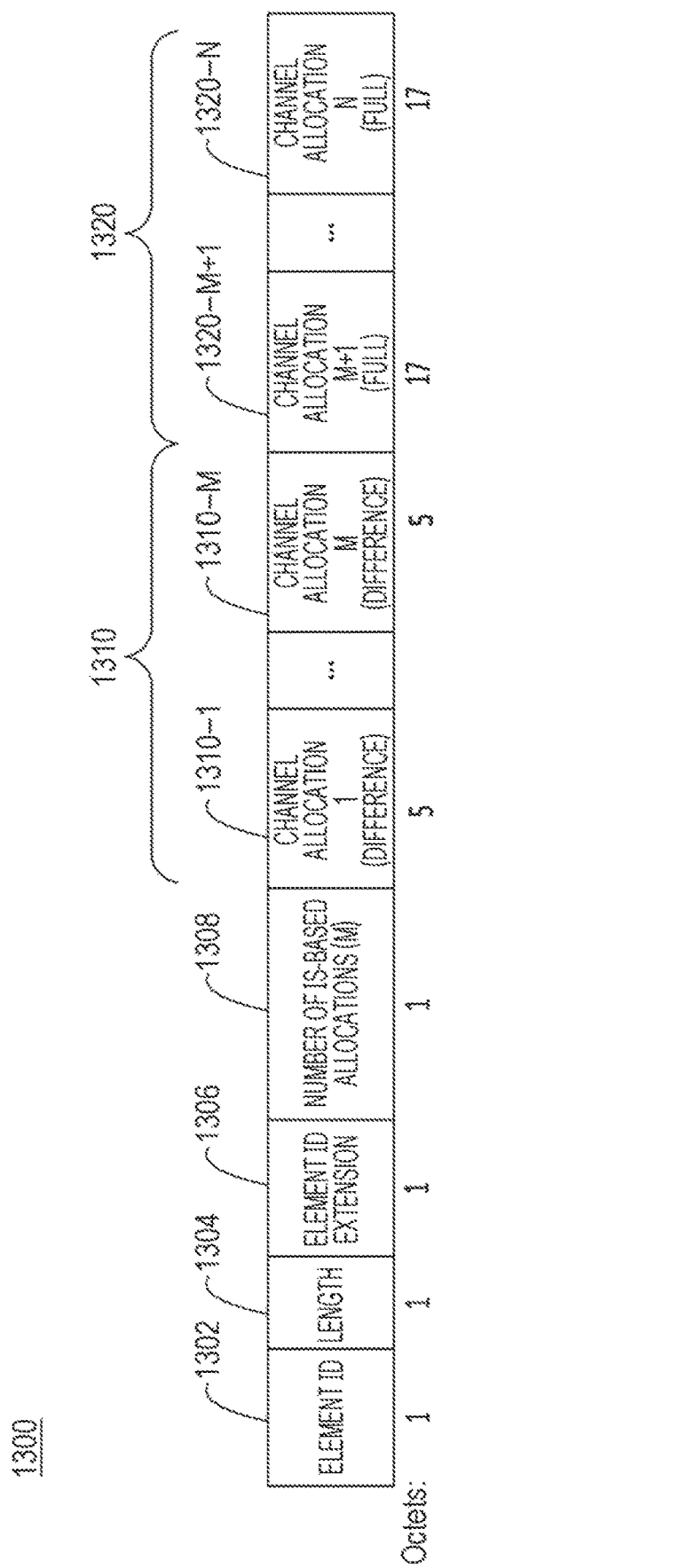
FIG. 16 is a diagram illustrating one example of the format of an EDMG_ESE according to a first modification of the first embodiment of the present disclosure.

FIG. 16 is a diagram illustrating one example of the format of an EDMG_ESE 1300 according to the first modification of the first embodiment of the present disclosure. The EDMG_ESE 1300 includes an element ID field 1302, a length field 1304, an element ID extension field 1306, a number-of-IS-based-allocations field 1308, IS-based channel allocation fields 1310 (1310-1 to 1310-M), and CS-based channel allocation fields 1320 (1320-M+1 to 1320-N). M is an integer greater than or equal to 1, and N is an integer greater than or equal to M+1.

The element ID field 1302 and the element ID extension field 1306 uniquely identify the EDMG_ESE 1300. The length field 1304 specifies the number of octets in the element ID extension field 1306, the number-of-IS-based-allocations field 1308, the plurality of IS-based channel allocation fields 1310, and the plurality of CS-based channel allocation fields 1320. The number-of-IS-based-allocations field 1308 indicates the number of IS-based channel allocation fields 1310.

The IS-based channel allocation fields 1310 are sequentially provided subsequent to the number-of-IS-based-allocations field 1308 and prior to the CS-based channel allocation fields 1320. Each IS-based channel allocation field 1310 is analogous to the IS-based channel allocation field in FIG. 9, except that the difference signaling field 918 is not included.

The CS-based channel allocation fields 1320 are sequentially provided subsequent to the IS-based channel allocation fields 1310. Each CS-based channel allocation field 1320 is analogous to the CS-based channel allocation field in FIG. 9, except that the difference signaling field 918 is not included.

Based on the values of the length field 1304 and the number-of-IS-based-allocations field 1308, the number of CS-based channel allocation fields 1320, $N_{CS}$, is calculated according to equation (1). The length of each IS-based channel allocation field 1310 and the length of each CS-based channel allocation field 1320 are known and are, for example, 5 and 17, respectively, in FIG. 16.

$$N_{CS} = (\text{"Value of Length Field 1304"} - 2 - \text{"Value of Number-of-IS-Based-Allocations Field 1308"} \times \text{"Length of IS-Based Channel Allocation Field 1310"}) / \text{"Length of CS-Based Channel Allocation field 1320"} \quad \text{Equation (1)}$$

In equation (1), "−2" in the numerator on the right-hand side corresponds to the length (1 octet in FIG. 16) of the element ID extension field 1306 and the length (1 octet in FIG. 16) of the number-of-IS-based-allocations field 1308. That is, in the numerator on the right-hand side of equation (1), the lengths of the fields other than the CS-based channel allocation fields 1320 are subtracted from the value of the length field 1304 to thereby calculate the entire length of the plurality of CS-based channel allocation fields 1320. The length in the numerator in equation (1) is divided by the length of one CS-based channel allocation field 1320 to thereby calculate the number of CS-based channel allocation fields 1320, $N_{CS}$.

In the first modification of the first embodiment, which of the IS and the CS each channel allocation field is based is determined based on the positions of the IS-based channel allocation fields 1310 and the CS-based channel allocation fields 1320 in the EDMG_ESE 1300, the value of the number-of-IS-based-allocations field 1308 (i.e., the number of IS-based channel allocation fields), and the number of CS-based channel allocation fields 1320, $N_{CS}$, instead of providing the difference signaling field 918 in each channel allocation field.

Since the difference signaling field is not provided in the EDMG_ESE 1300 in the first modification of the first embodiment, it is possible to reduce the size of each channel allocation field by 1 bit.

<Second Modification of First Embodiment>

In a second modification of the first embodiment, a description will be given of yet another example in which a method different from the method using the difference signaling field 918 (see FIG. 9) is used to indicate on which of the IS and the CS each channel allocation field is based.

Figure 17:
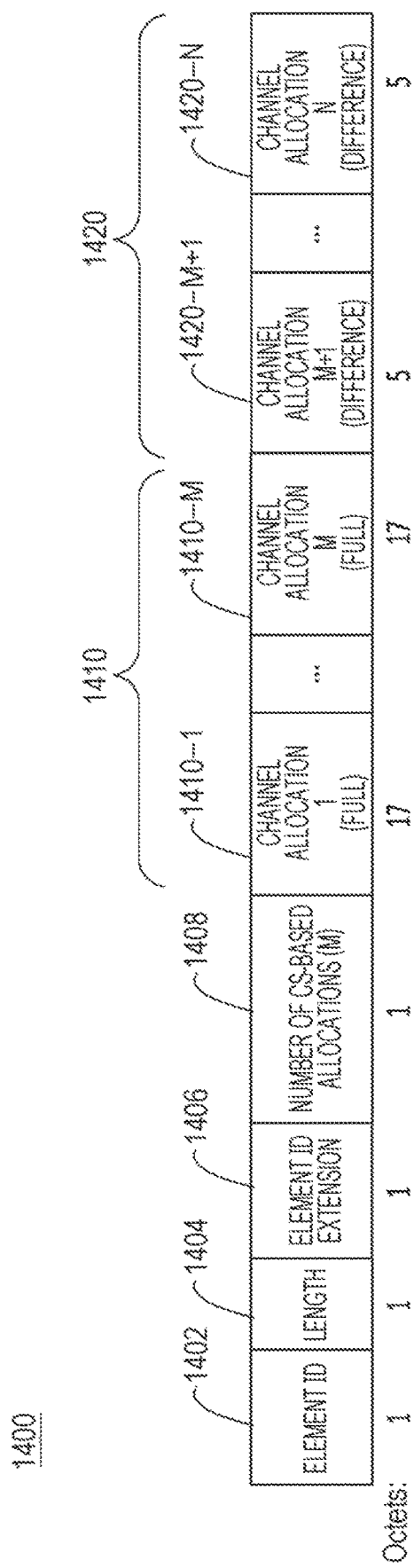
FIG. 17 is a diagram illustrating one example of the format of an EDMG_ESE according to a second modification of the first embodiment of the present disclosure.

FIG. 17 is a diagram illustrating one example of the format of an EDMG_ESE 1400 according to the second modification of the first embodiment of the present disclosure. The EDMG_ESE 1400 includes an element ID field 1402, a length field 1404, an element ID extension field 1406, a number-of-CS-based-allocations field 1408, CS-based channel allocation fields 1410 (1410-1 to 1410-M), and IS-based channel allocation fields 1420 (1420-M+1 to 1420-N). M is an integer greater than or equal to 1, and N is an integer greater than or equal to M+1.

The element ID field 1402 and the element ID extension field 1406 uniquely identify the EDMG_ESE 1400. The length field 1404 specifies the number of octets in the element ID extension field 1406, the number-of-CS-based-allocations field 1408, the plurality of CS-based channel allocation fields 1410, and the plurality of IS-based channel allocation fields 1420. The number-of-CS-based-allocations field 1408 indicates the number of CS-based channel allocation fields 1410.

The CS-based channel allocation fields 1410 are sequentially provided subsequent to the number-of-CS-based-allocations field 1408 and prior to the CS-based channel allocation fields 1420. Each CS-based channel allocation field 1410 is analogous to the IS-based channel allocation field in FIG. 9, except that the difference signaling field 918 is not included.

The IS-based channel allocation fields 1420 are sequentially provided subsequent to the CS-based channel allocation fields 1410. Each IS-based channel allocation field 1420 is analogous to the IS-based channel allocation field in FIG. 9, except that the difference signaling field 918 is not included.

Based on the values of the length field 1404 and the number-of-CS-based-allocations field 1408, the number of IS-based channel allocation fields 1420, $N_{IS}$, are calculated according to equation (2). The length of each CS-based channel allocation field 1410 and the length of each IS-based channel allocation fields 1420 are known and are, for example, 17 and 5, respectively, in FIG. 17.

$$N_{IS} = (\text{"Value of Length Field \textbf{1404}"} - 2 - \text{"Value of Number-of-CS-Based-Allocations Field \textbf{1408}"} \times \text{"Length of CS-Based Channel Allocation Field \textbf{1410}"}) / \text{"Length of IS-Based Channel Allocation Field \textbf{1420}"} \quad \text{Equation (2)}$$

In the second modification of the first embodiment, which of the IS and the CS each channel allocation is based is determined based on the positions of the CS-based channel allocation fields 1410 and the IS-based channel allocation fields 1420 in the EDMG_ESE 1400, the value of the number-of-CS-based-allocations field 1408 (i.e., the number of CS-based channel allocation fields), and the number of IS-based channel allocation fields 1320, $N_{IS}$, instead of providing a difference signaling field in each channel allocation field.

In the EDMG_ESE 1400 in the second modification of the first embodiment, since the difference signaling field is not provided, the size of each channel allocation field can be reduced by one bit.

Second Embodiment

Figure 18:
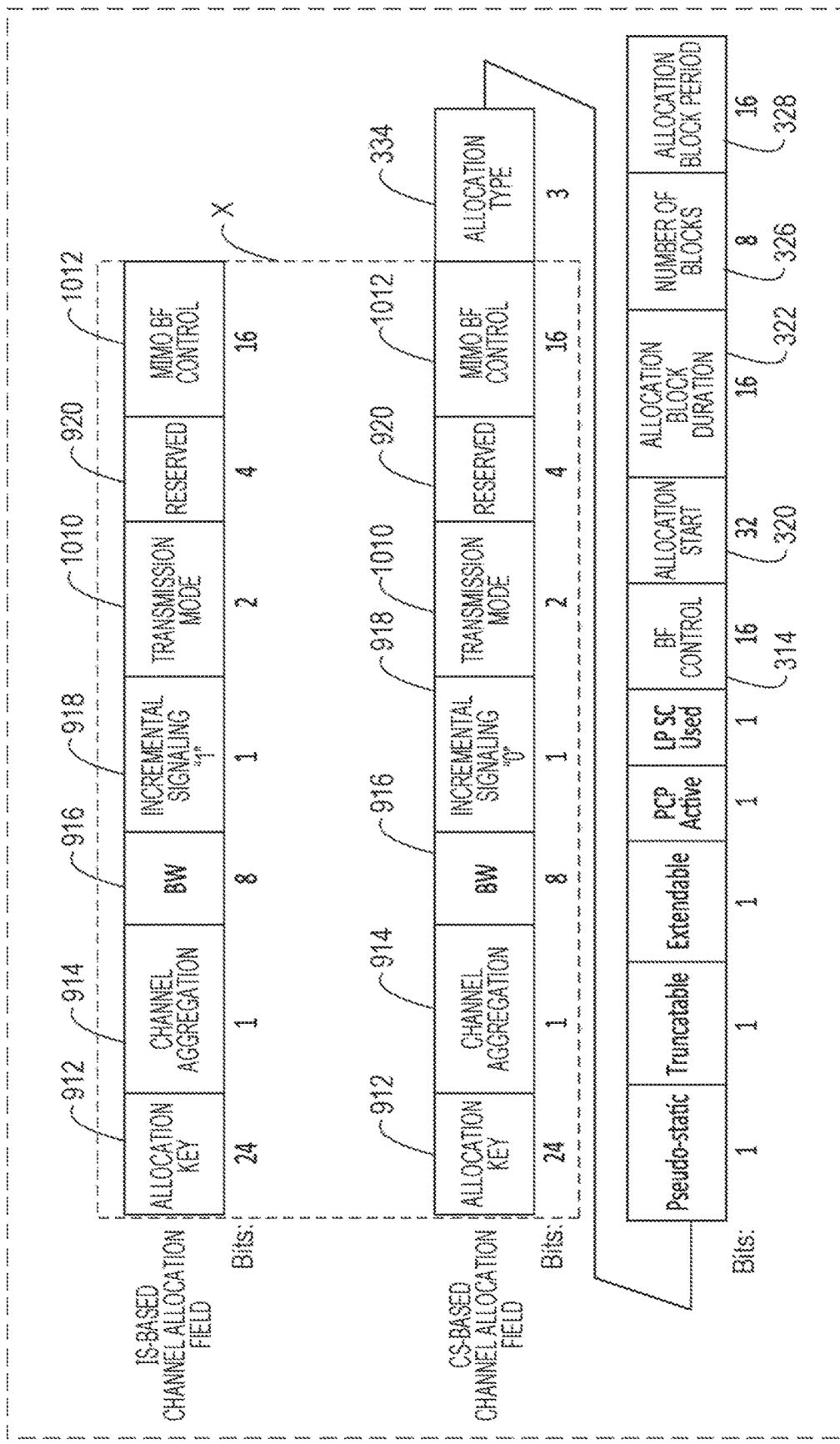
FIG. 18 is a diagram illustrating one example of the formats of IS-based and CS-based channel allocation fields included in an EDMG_ESE according to a second embodiment of the present disclosure.

FIG. 18 is a diagram illustrating one example of the formats of IS-based and CS-based channel allocation fields included in an EDMG_ESE according to a second embodiment of the present disclosure. In FIG. 18, constituents that are analogous to those in FIG. 9 are denoted by the same reference numerals, and descriptions thereof are omitted.

The format of the IS-based channel allocation field in FIG. 18 includes a transmission mode field 1010 and a multiple-input multiple-output (MIMO) BF control field 1012, in addition to the format of the IS-based channel allocation field in FIG. 9. The format of the IS-based channel allocation field may contain parameters for performing beamforming during allocation therefor.

The format of the CS-based channel allocation field in FIG. 18 includes a transmission mode field 1010 and a MIMO BF control field 1012, in addition to the format of the CS-based channel allocation field in FIG. 9.

The transmission mode field 1010 indicates which of a single-input single-output (SISO) transmission, a single user MIMO (SU-MIMO) transmission, and a downlink multiuser MIMO (DL MU-MIMO) transmission is to be started in the allocation.

The MIMO BF control field 1012 contains difference signaling related to MIMO BF training for the BF control field 314 in the ESE 300.

For example, the MIMO BF control field 1012 contains first signaling for indicating whether or not SU-MIMO BF training for an initiator link is required, second signaling for indicating whether or not SU-MIMO BF training for a responder link is required, and third signaling for indicating whether or not DL MU-MIMO BF training is required. The MIMO BF control field 1012 may also contain an additional parameter regarding the SU-MIMO BF training for the initiator link, an additional parameter regarding the SU-MIMO BF training for the responder link, and an additional parameter regarding the DL MU-MIMO BF training. When a SISO transmission is started in an allocation, the MIMO BF control field 1012 is treated as the reserved field 920 in the channel allocation field.

The parameters contained in the MIMO BF control field 1012, that is, the parameters for the difference signaling related to MIMO BF training for the BF control field 314, are not limited to BF training and may be used for MIMO data communication. For example, the parameters contained in the MIMO BF control field 1012 include a parameter regarding antenna directivity control and a parameter regarding the number of MIMO streams.

<Summary of Second Embodiment>

In the second embodiment of the present disclosure, the first six signaling fields (or the first seven signaling fields including the reserved field) in the IS-based channel allocation field are the same as the first six signaling fields (or the first seven signaling fields including the reserved field) in the CS-based channel allocation field. As a result, a receiving apparatus (e.g., a STA) can handle the first six signaling fields in each channel allocation field in the same way, thus making it possible to simplify processing in the receiving apparatus.

Also, in the second embodiment of the present disclosure, since each allocation field in the EDMG_ESE has the transmission mode field and the MIMO BF control field, a receiving apparatus (e.g., an EDMG_STA) that decodes the EDMG_ESE can perform transmission-mode switching and BF training.

The MIMO BF control field included in the EDMG_ESE is a field for reporting parameters regarding extension functions added by the IEEE 802.11ay standard. The extension functions are, for example, data communication and BF training using MIMO. The ESE is a schedule element defined by the IEEE 802.11ad standard and thus does not report parameters regarding the extension functions added by the IEEE 802.11ay standard.

For example, when the BF training in the extension functions is performed over a primary channel, the amount of beacon frame data can be reduced, since each IS-based channel allocation field includes the MIMO BF control field.

When the BF training in the extension functions is not performed in an allocation including a primary channel (i.e., when the BF control field does not specify any extension function), a beacon frame does not have to include the EDMG_ESE. When a beacon frame does not include the EDMG_ESE, it is possible to reduce the amount of beacon frame data.

Third Embodiment

Each channel allocation field in an EDMG_ESE according to a third embodiment of the present disclosure has a signaling field that is the same as in the allocation field in the ESE, in addition to the source AID field, the destination AID field, and the allocation ID field.

For example, each channel allocation field in the EDMG_ESE includes an allocation type field or an allocation block duration field as a common signaling field.

When a MAC frame including an ESE and an EDMG_ESE is transmitted over a primary channel, the common signaling field in the channel allocation field for an allocation not including the primary channel, the channel allocation field being included in the EDMG_ESE, is set to an actual value. On the other hand, the common signaling field in the allocation field for an allocation not including the primary channel, the allocation field being included in the ESE, is set to an invalid value.

For example, when the common signaling field is an allocation block duration field, the allocation block duration field in the allocation field for an allocation not including the primary channel, the allocation field being included in the ESE, is set to 0, which is an invalid value.

Also, for example, when the common signaling field is an allocation type field, the allocation type field in the allocation field for an allocation not including the primary channel, the allocation field being included in the ESE, is set to one value (e.g., one of 2, 3, 4, 5, 6, and 7) that indicates neither a CBAP nor an SP.

In an allocation including the primary channel, the common signaling field in the channel allocation field in the EDMG_ESE and the common signaling field in the allocation field in the ESE are both set to actual values.

Figure 19:
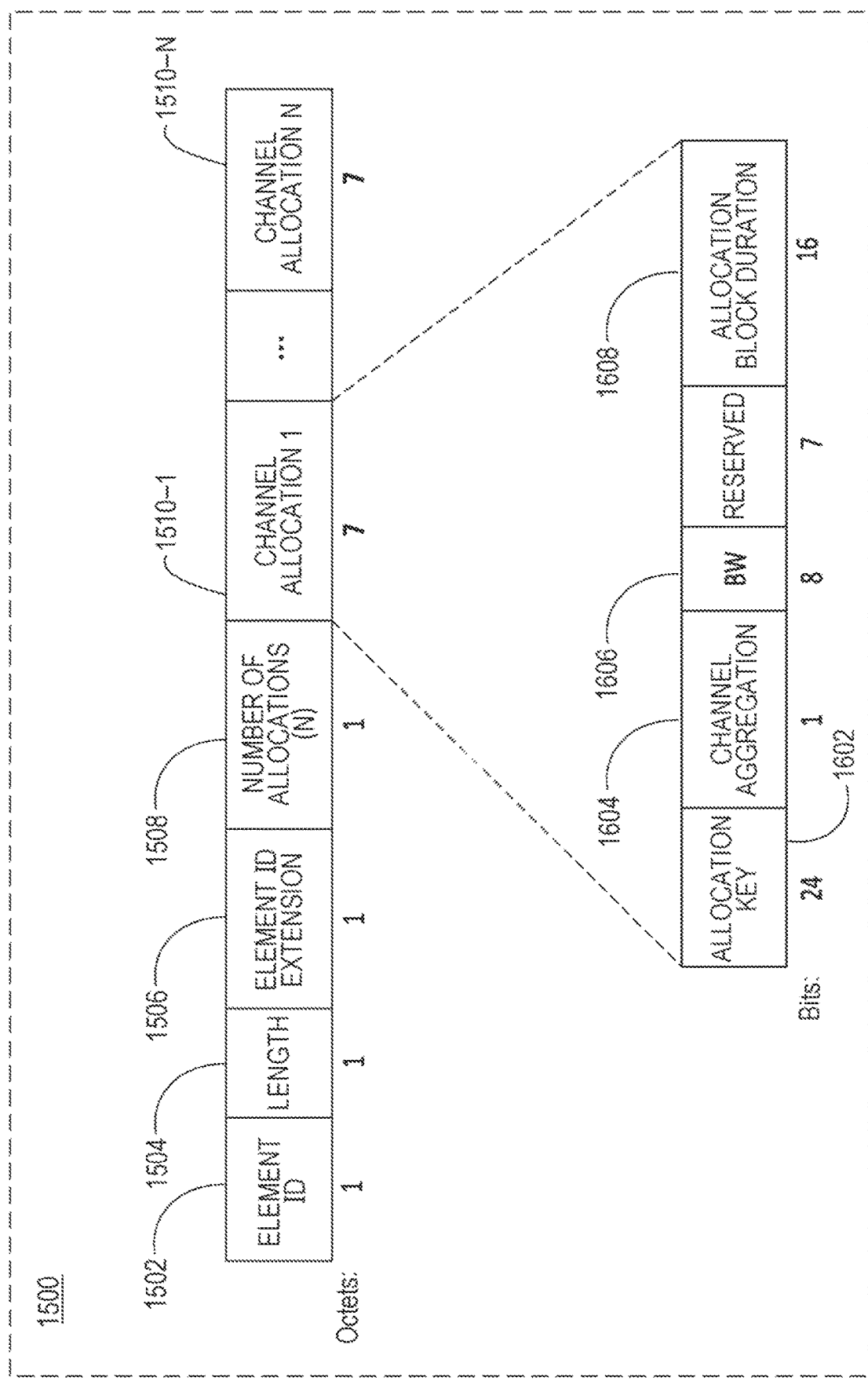
FIG. 19 is a diagram illustrating one example of the format of an EDMG_ESE according to a third embodiment of the present disclosure.

FIG. 19 is a diagram illustrating one example of the format of an EDMG_ESE 1500 according to the third embodiment of the present disclosure. The EDMG_ESE 1500 includes an element ID field 1502, a length field 1504, an element ID extension field 1506, a number-of-allocations field 1508, and channel allocation fields 1510 (1510-1 to 1510-N, where N is an integer greater than or equal to 1).

The element ID field 1502 and the element ID extension field 1506 uniquely identify the EDMG_ESE 1500. The length field 1504 specifies the number of octets in the element ID extension field 1506, the number-of-allocations field 1508, and the channel allocation fields 1510. The number-of-allocations field 1508 indicates the number of channel allocation fields 1510.

Although an example in which the EDMG_ESE 1500 includes the number-of-allocations field 1508 will be described in FIG. 19, the EDMG_ESE 1500 does not have to include the number-of-allocations field 1508. For example, the number of allocations, N, may be calculated using N=("Length Field"−1)/ "Length (7 in the example FIG. 19) of Channel Allocation Field 1510".

Each channel allocation field 1510 contains difference scheduling information for a specific allocation. Each channel allocation field 1510 includes an allocation key field 1602, a channel aggregation field 1604, a BW field 1606, and an allocation block duration field 1608. The allocation key field 1602, the channel aggregation field 1604, and the BW field 1606 are analogous to the allocation key field 512, the channel aggregation field 514, and the BW field 516 in FIG. 6.

The allocation block duration field 1608 is a common signaling field and is analogous to the allocation block duration field 322 in the ESE 300 in FIG. 5. Alternatively, the allocation block duration field 1608 may be replaced with an allocation type field that is analogous to the allocation type field 334 in the ESE 300 in FIG. 3.

Next, a description will be given of one example of an ESE and an EDMG_ESE for scheduling. The example illustrated in FIG. 10 is incorporated here for the scheduling.

The ESE and the EDMG_ESE included in the MAC frame 1101 transmitted over CH1 in FIG. 10 will be described with reference to FIG. 20.

Figure 20:
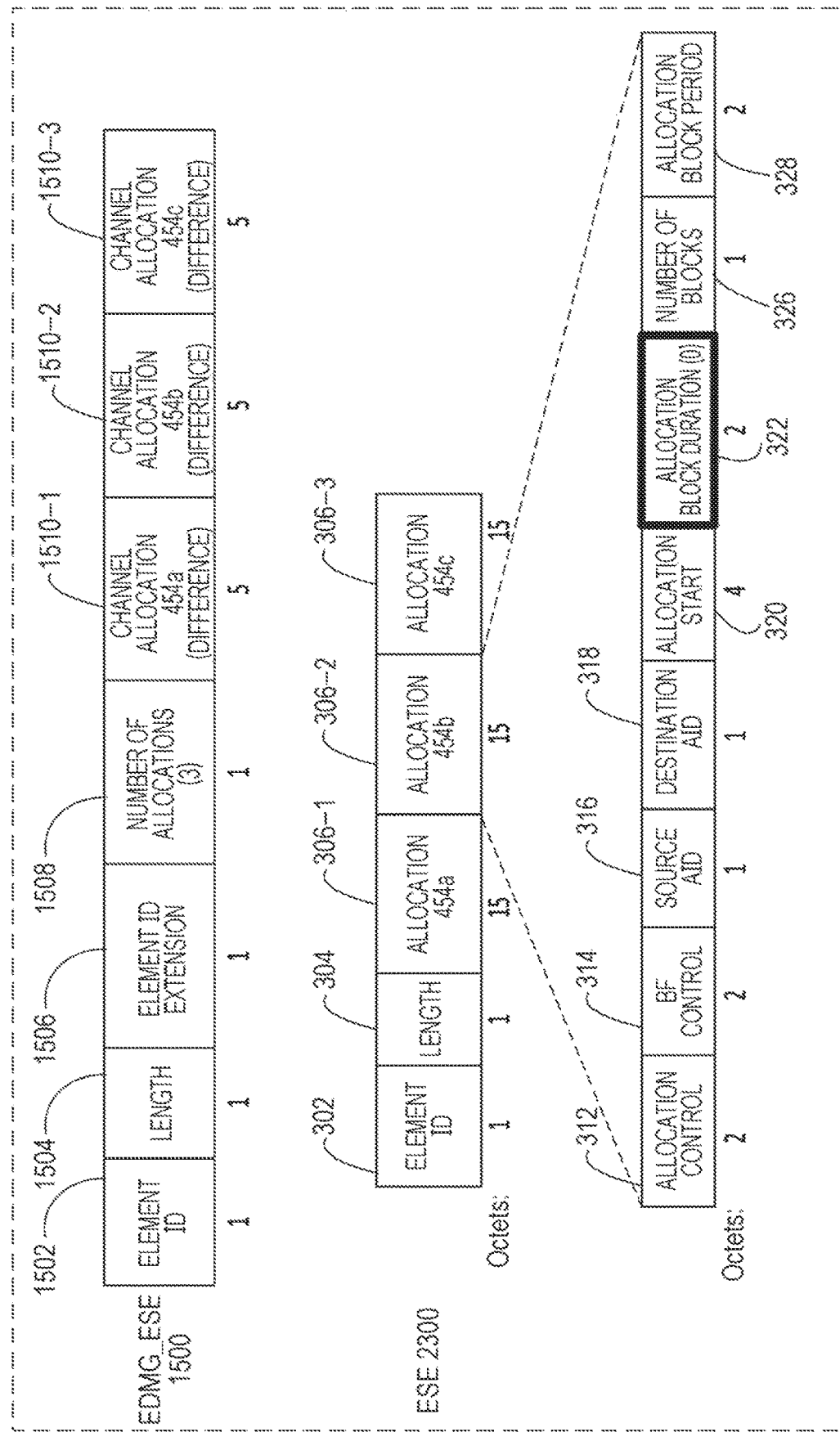
FIG. 20 is a diagram illustrating, in the third embodiment of the present disclosure, one example of an ESE and an EDMG_ESE transmitted over a primary channel CH1 in FIG. 10.

FIG. 20 is a diagram illustrating, in the third embodiment of the present disclosure, one example of an ESE 2300 and an EDMG_ESE 1500 transmitted over the primary channel CH1 in FIG. 10. In FIG. 20, constituents that are analogous to those in FIGS. 5 and 19 are denoted by the same reference numerals, and descriptions thereof are omitted.

The ESE 2300 has an allocation field 306-1 for signaling scheduling information for the allocation 454a including the primary channel CH1, an allocation field 306-2 for signaling scheduling information for the allocation 454b not including the primary channel CH1, and an allocation field 306-3 for signaling scheduling information for the allocation 454c including the primary channel CH1.

The EDMG_ESE 1500 has a channel allocation field 1510-1 for signaling difference scheduling information for the allocation 454a including the primary channel CH1, a channel allocation field 1510-2 for signaling difference scheduling information for the allocation 454b not including the primary channel CH1, and a channel allocation field 1510-3 for signaling difference scheduling information for the allocation 454c including the primary channel CH1.

The allocation block duration field 322 in the allocation field 306-2 for the allocation 454b not including the primary channel CH1, the allocation field 306-2 being included in the ESE 2300, is set to 0. The allocation block duration fields 322 (not illustrated) in the allocation fields 306-1 and 306-3 are set to actual values. Also, the allocation block duration fields 1608 (see FIG. 19) added to the channel allocation fields 1510 in the EDMG_ESE 1500 are set to actual values.

A DMG_PCP/AP located in the primary channel CH1 and in an adjacent network receives the MAC frame 1101 including the ESE 2300 and the EDMG_ESE 1500 in FIG. 20 and decodes the ESE 2300 to obtain the scheduling information for the allocations 454a and 454c. Also, upon recognizing that the allocation block duration field 322 in the allocation field 306-2 for the allocation 454b is set to 0, the DMG_PCP/AP determines that the allocation 454b is, in practice, an allocation that is not scheduled on the primary channel CH1. Accordingly, the DMG_PCP/AP can perform another allocation to the resource (the region Y1 in FIG. 10) in the time corresponding to the time of the allocation 454b, the resource being included in the primary channel CH1.

Also, although the allocation block duration field 322 in the allocation field 306-2 for the allocation 454b, the allocation 306-2 being included in the ESE 2300 in FIG. 20, is set to 0, the allocation block duration field 1608 (not illustrated) set to an actual value is included in the channel allocation field 1510-2 for the allocation 454b, the channel allocation field 1510-2 being included in the EDMG_ESE 1500 in FIG. 20. Accordingly, the EDMG_STA can obtain scheduling information for all allocations including the allocation 454b, by decoding the ESE 2300 and the EDMG_ESE 1500 in FIG. 20.

<Summary of Third Embodiment>

In the third embodiment described above, each channel allocation field 1510 in the EDMG_ESE 1500 has the common signaling field (e.g., the allocation type field or the allocation block duration field) that is common to the allocation fields 306 in the ESE, in addition to the source AID field, the destination AID field, and the allocation ID field.

The common signaling field regarding each allocation not including (not occupying) the primary channel, the common signaling field being included in the ESE included in the MAC frame transmitted over the primary channel, is set to an invalid value, and the common signaling field in the EDMG_ESE is set to an actual value.

With this configuration, a DMG_PCP/AP located in the primary channel and in an adjacent network can avoid interpreting an allocation not including the primary channel as an allocation including the primary channel, by decoding the ESE. This allows the DMG_PCP/AP to more efficiency perform scheduling for the primary channel, thus improving the channel utilization efficiency of the primary channel.

Fourth Embodiment

Figure 21:
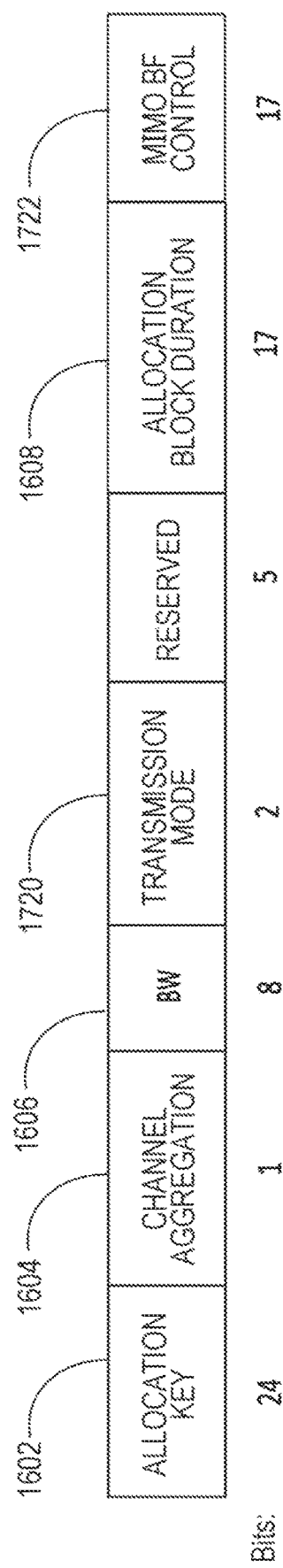
FIG. 21 is a diagram illustrating one example of the format of each channel allocation field included in an EDMG_ESE according to a fourth embodiment of the present disclosure.

FIG. 21 is a diagram illustrating one example of the format of each channel allocation field included in an EDMG_ESE according to a fourth embodiment of the present disclosure. In FIG. 21, constituents that are analogous to those in FIG. 19 are denoted by the same reference numerals, and descriptions thereof are omitted.

The format of the channel allocation field in FIG. 21 includes a transmission mode field 1720 and a MIMO BF control field 1722 in addition to the format of the channel allocation field 1510 in FIG. 19.

The transmission mode field 1720 indicates which of a SISO transmission, an SU-MIMO transmission, and a DL MU-MIMO transmission is to be started in the allocation.

The MIMO BF control field 1722 includes difference signaling related to MIMO BF training for the BF control field 314 in the ESE 300.

For example, the MIMO BF control field 1722 contains first signaling for indicating whether or not SU-MIMO BF training for an initiator link is required, second signaling for indicating whether or not SU-MIMO BF training for a responder link is required, and third signaling for indicating whether or not DL MU-MIMO BF training is required. The MIMO BF control field 1722 may also contain an additional parameter regarding the SU-MIMO BF training for the initiator link, an additional parameter regarding the SU-MIMO BF training for the responder link, and an additional parameter regarding the DL MU-MIMO BF training. When a SISO transmission is started in an allocation, the MIMO BF control field 1722 is treated as a reserved field in the channel allocation field for the allocation.

<Summary of Fourth Embodiment>

In the fourth embodiment of the present disclosure, since each allocation field in the EDMG_ESE has the transmission mode field and the MIMO BF control field, a receiving apparatus (e.g., an EDMG_STA) that can decode the EDMG_ESE can perform transmission-mode switching and BF training.

The formats of the frames described above in the embodiments are examples, and the present disclosure is not limited thereto. For example, the order of the fields included in the frames and/or the sizes of the fields may be changed.

Although examples in which the present disclosure is implemented by hardware have been described in the embodiments above, the present disclosure may be implemented by software. Also, the scheme for implementing an integrated circuit is not limited to a scheme for LSI and may be realized with a dedicated circuit or a general-purpose processor. A field programmable gate array (FPGA) that can be programmed after manufacture of an LSI or a reconfigurable processor that allows reconfiguration of connections or settings of circuit cells in an LSI may also be utilized.

In addition, when a circuit integration technology that replaces LSI, for example, an application example using biotechnology or the like, becomes available with the advancement of semiconductor technology or other derivative technology, the technology may also be used to integrate the functional blocks.

Each embodiment described above can be used for a cellular phone, a smartphone, a tablet terminal, and a television terminal that transmit or receive at least one of video, pictures, text, and sound.

Although various embodiments have been described above with reference to the accompanying drawings, it goes without saying that the present disclosure is not limited to such examples. It is apparent to those skilled in the art that various variations and modifications can be conceived within the scope recited in the claims, and it is to be understood that those variations and modifications also naturally belong to the technical scope of the present disclosure. Also, the constituent elements in the embodiments described above may be arbitrarily combined together within a scope that does not depart from the spirit of the present disclosure.

The present disclosure can also be implemented as any types of apparatus, device, and system having communication functions (these are collectively referred to as "communication apparatuses"). Non-limiting examples of the communication apparatuses include phones (such as mobile phones and smartphones), tablet computers, personal computers (PCs, such as laptop, desktop, and notebook PCs), cameras (such as digital still/video cameras), digital players (such as digital audio/video players), wearable devices (such as wearable cameras, smartwatches, and tracking devices), game consoles, digital book readers, telehealth and telemedicine (remote healthcare and medicine prescription) devices, vehicles or transport systems (such as automobiles, airplanes, and ships) with communication functions, and any combination of the above-described various apparatuses.

The communication apparatuses are not limited to portable or movable communication apparatuses and include any types of apparatus, device, and system that are non-portable or fixed. Examples of such communication apparatuses include smart home devices (such as household electrical and electronic equipment, lighting equipment, smart meters, and measurement equipment, and control panels), vending machines, and any "things" that exist on IoT (Internet of Things) networks.

Communication includes data communication using cellular systems, wireless local-area network (LAN) systems, and communication satellite systems and data communication using a combination of these systems.

The communication apparatuses also include devices, such as controllers and sensors, that are connected or coupled to communication devices (described below in the present disclosure) that execute communication functions. For example, the communication apparatuses include controllers and sensors that generate control signals and/or data signals used by communication devices that execute communication functions of the communication apparatuses.

The communication apparatuses further include infrastructure equipment that performs communication with the above-described various non-limiting apparatuses or that controls the various apparatuses. Examples of the infrastructure equipment include base stations, access points, and any other apparatuses, devices, and systems.

<Summary of the Present Disclosure>

A transmitting apparatus in the present disclosure includes: a transmission-signal generating circuit that generates at least one of a first type of schedule element supporting an allocation involving a single channel and a second type of schedule element supporting an allocation involving a plurality of channels and that generates a media-access-control (MAC) frame including the generated first type of schedule element and/or the generated second type of schedule element; and a transmitting circuit that transmits the MAC frame over a first channel. When the allocation involving the plurality of channels includes the first channel, the transmission-signal generating circuit generates the first type of schedule element including all information regarding the allocation involving the plurality of channels and generates the second type of schedule element including difference information indicating the generated first type of schedule element, and when the allocation involving the plurality of channels does not include the first channel, the transmission-signal generating circuit omits the generation of the first type of schedule element and generates the second type of schedule element including all the information regarding the allocation involving the plurality of channels.

In the transmitting apparatus in the present disclosure, the first type of schedule element may be an extended schedule element that complies with an IEEE 802.11ad standard, and the second type of schedule element may be an enhanced directional multi-gigabit (EDMG) extended schedule element that complies with an IEEE 802.11ay standard.

In the transmitting apparatus in the present disclosure, the MAC frame may be either a directional multi-gigabit (DMG) beacon frame or an announce frame.

A receiving apparatus in the present disclosure includes: a receiving circuit that receives a MAC frame from a transmitting apparatus over a first channel, the MAC frame including at least one of a first type of schedule element corresponding to an allocation involving a single channel and a second type of schedule element corresponding to an allocation involving a plurality of channels; and a signal processing circuit that determines the allocation involving the plurality of channels, by using the schedule element included in the MAC frame. With respect to the first type of schedule element and/or the second type of schedule element included in the MAC frame transmitted from the transmitting apparatus, when the allocation involving the plurality of channels does not include the first channel, the transmitting apparatus omits the generation of the first type of schedule element and generates the second type of schedule element including all information regarding the allocation involving the plurality of channels, and when the allocation involving the plurality of channels includes the first channel, the transmitting apparatus generates the first type of schedule element including all the information regarding the allocation involving the plurality of channels and generates the second type of schedule element including difference information indicating the generated first type of schedule element.

In the receiving apparatus in the present disclosure, the first type of schedule element may be an extended schedule element that complies with an IEEE 802.11ad standard, and the second type of schedule element may be an EDMG extended schedule element that complies with an IEEE 802.11ay standard.

In the receiving apparatus in the present disclosure, the MAC frame may be either a DMG beacon frame or an announce frame.

The present disclosure can be applied to a method for scheduling allocations on one or more channels in a multi-user wireless communication system.

What is claimed is:

1. A transmission apparatus comprising:
a transmission-signal generating circuit which, in operation, generates a MAC frame including a first type of schedule element and a second type of schedule element, the first type of schedule element corresponding to channel allocation(s) over a primary channel and the second type of schedule element corresponding to channel allocation(s) over a plurality of channels; and
a transmitting circuit which, in operation, transmits the generated MAC frame over the primary channel,
wherein, for a channel allocation where the plurality of channels includes the primary channel,
the first type of schedule element includes an Allocation field containing allocation time information; and
the second type of schedule element includes a Channel Allocation field containing supplemental allocation information to the Allocation field in the first type of schedule element, and
wherein for another channel allocation where the plurality of channels does not include the primary channel,
the second type of schedule element includes a Channel Allocation field containing complete allocation information regarding the other channel allocation over the plurality of channels.

2. The transmission apparatus according to claim 1, wherein the first type of schedule element is an Extended Schedule element that complies with an IEEE 802.11ad standard, and
the second type of schedule element is an EDMG (Enhanced Directional Multi-Gigabit) Extended Schedule element that complies with an IEEE 802.11ay standard.

3. The transmission apparatus according to claim 1, wherein the MAC frame is either a DMG (Directional Multi-Gigabit) Beacon frame or an Announce frame.

4. The transmission apparatus according to claim 1, wherein the second type of schedule element comprises one or more Channel Allocation fields, and each of the Channel Allocation fields comprises a signaling type subfield indicating whether the supplemental allocation information to the Allocation field is included or the complete allocation information is included in the Channel Allocation field itself.

5. The transmission apparatus according to claim 4, wherein the supplemental allocation information includes bandwidth information of a corresponding channel allocation.

6. A transmission method comprising:
generating a MAC frame including a first type of schedule element and a second type of schedule element, the first type of schedule element corresponding to channel allocation(s) over a primary channel and the second type of schedule element corresponding to channel allocation(s) over a plurality of channels; and
transmitting the generated MAC frame over the primary channel,
wherein, for a channel allocation where the plurality of channels includes the primary channel,
the first type of schedule element includes an Allocation field containing allocation time information; and
the second type of schedule element includes a Channel Allocation field containing supplemental allocation information to the Allocation field in the first type of schedule element, and
wherein for another channel allocation where the plurality of channels does not include the primary channel, the second type of schedule element includes a Channel Allocation field containing complete allocation information regarding the other channel allocation over the plurality of channels.

7. The transmission method according to claim 6, wherein the first type of schedule element is an Extended Schedule element that complies with an IEEE 802.11ad standard, and the second type of schedule element is an EDMG (Enhanced Directional Multi-Gigabit) Extended Schedule element that complies with an IEEE 802.11ay standard.

8. The transmission method according to claim 6, wherein the MAC frame is either a DMG (Directional Multi-Gigabit) Beacon frame or an Announce frame.

9. The transmission method according to claim 6, wherein the second type of schedule element comprises one or more Channel Allocation fields, and each of the Channel Allocation fields comprises a signaling type subfield indicating whether the supplemental allocation information to the Allocation field is included or the complete allocation information is included in the Channel Allocation field itself.

10. The transmission method according to claim 9, wherein the supplemental allocation information includes bandwidth information of a corresponding channel allocation.

* * * * *